United States Patent
Kaneda

(10) Patent No.: US 7,548,916 B2
(45) Date of Patent: Jun. 16, 2009

(54) CALCULATING IMAGE SIMILARITY USING EXTRACTED DATA

(75) Inventor: Kitahiro Kaneda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 10/832,400

(22) Filed: Apr. 27, 2004

(65) Prior Publication Data

US 2004/0220962 A1 Nov. 4, 2004

(30) Foreign Application Priority Data

Apr. 30, 2003 (JP) ............................. 2003-125818

(51) Int. Cl.
*G06F 7/00* (2006.01)

(52) U.S. Cl. ...................... 707/6; 707/102; 707/104.1

(58) Field of Classification Search ................ 707/1, 707/3–102; 382/224; 395/600; 706/14; 345/418; 348/231.2
See application file for complete search history.

(56) References Cited

U.S. PATENT DOCUMENTS

| | | | | |
|---|---|---|---|---|
| 5,680,478 | A | 10/1997 | Wang et al. | 382/176 |
| 5,802,361 | A * | 9/1998 | Wang et al. | 382/217 |
| 5,987,460 | A * | 11/1999 | Niwa et al. | 707/6 |
| 5,991,466 | A | 11/1999 | Ushiro et al. | 382/305 |
| 5,999,664 | A * | 12/1999 | Mahoney et al. | 382/305 |
| 6,026,388 | A * | 2/2000 | Liddy et al. | 707/1 |
| 6,397,213 | B1* | 5/2002 | Cullen et al. | 707/5 |
| 6,457,004 | B1* | 9/2002 | Nishioka et al. | 707/5 |
| 6,463,432 | B1* | 10/2002 | Murakawa | 707/5 |
| 6,760,714 | B1* | 7/2004 | Caid et al. | 706/14 |
| 6,785,421 | B1* | 8/2004 | Gindele et al. | 382/217 |
| 6,804,683 | B1* | 10/2004 | Matsuzaki et al. | 707/104.1 |
| 6,826,316 | B2* | 11/2004 | Luo et al. | 382/305 |

(Continued)

FOREIGN PATENT DOCUMENTS

JP 10-254903 A 9/1998

(Continued)

OTHER PUBLICATIONS

Stejic et al., Image similarity computation using local similarity patterns generated by genetic algorithm, May 12-17, 2002, IEEE, vol. 1, pp. 771-776.*

(Continued)

*Primary Examiner*—Apu M Mofiz
*Assistant Examiner*—Jessica N Le
(74) *Attorney, Agent, or Firm*—Fitzpatrick, Cella, Harper & Scinto

(57) ABSTRACT

Retrieval accuracy is improved by causing a difference in layout from document to document to be reflected in retrieval at will. To achieve this, there is provided an information processing method for a case having a plurality of retrieval steps (S1209, S1211, S1212) of retrieving image data that is similar to an input document image, the method including a step (S1200) of inputting weighting information for weighting a degree of similarity calculated by each of the retrieval steps; a step of weighting the degree of similarity, which has been calculated by each of the retrieval steps, for every item of image data on the basis of the weighting information, and calculating overall degree of similarity; and a step (S1213) of displaying the similar image data based upon the overall degree of similarity calculated.

23 Claims, 22 Drawing Sheets

U.S. PATENT DOCUMENTS

| | | | |
|---|---|---|---|
| 7,043,474 B2 * | 5/2006 | Mojsilovic et al. | 707/6 |
| 2001/0004739 A1 * | 6/2001 | Sekiguchi et al. | 707/100 |
| 2001/0045948 A1 * | 11/2001 | Shiiyama | 345/418 |
| 2002/0168117 A1 * | 11/2002 | Lee et al. | 382/305 |
| 2002/0178135 A1 * | 11/2002 | Tanaka | 707/1 |
| 2003/0101177 A1 * | 5/2003 | Matsubayashi et al. | 707/6 |
| 2004/0013305 A1 * | 1/2004 | Brandt et al. | 382/224 |
| 2005/0041886 A1 * | 2/2005 | Wada | 382/305 |

FOREIGN PATENT DOCUMENTS

| | | |
|---|---|---|
| JP | 10-312325 A | 11/1998 |
| JP | 3017851 | 3/2000 |
| JP | 2000-148793 A | 5/2000 |
| JP | 2001-76095 A | 3/2001 |
| JP | 2001-319231 A | 11/2001 |

OTHER PUBLICATIONS

Yeung et al., Improving Performance of Similarity-Based Clustering by Feature Weight Learning, Apr. 2002, IEEE, vol. 24, Issue 4, pp. 556-561.*

Japanese Office Action dated Sep. 22, 2008 in corresponding Japanese Application No. 2003-125818.

Japanese Office Action dated Jan. 16, 2009 in corresponding Japanese Application No. 2003-125818.

* cited by examiner

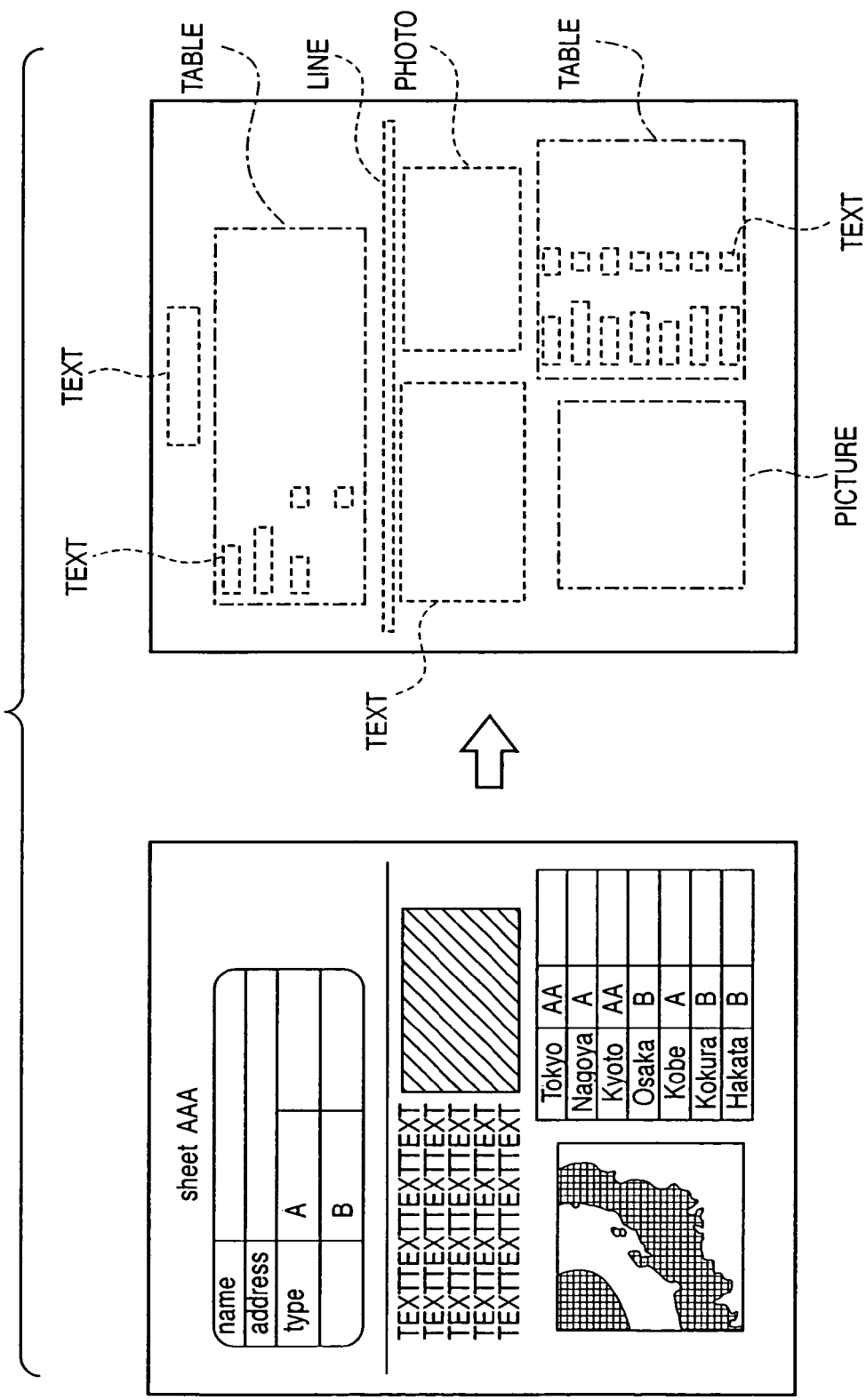

FIG. 5A  BLOCK INFORMATION

| | ATTRIBUTE | X COORDINATE | Y COORDINATE | WIDTH W | HEIGHT H | OCR INFORMATION |
|---|---|---|---|---|---|---|
| BLOCK 1 | 1 | X1 | Y1 | W1 | H1 | YES |
| BLOCK 2 | 3 | X2 | Y2 | W2 | H2 | YES |
| BLOCK 3 | 4 | X3 | Y3 | W3 | H3 | NO |
| BLOCK 4 | 1 | X4 | Y4 | W4 | H4 | YES |
| BLOCK 5 | 5 | X5 | Y5 | W5 | H5 | YES |
| BLOCK 6 | 2 | X6 | Y6 | W6 | H6 | NO |
| BLOCK 7 | 3 | X7 | Y7 | W7 | H7 | YES |

*ATTRIBUTE 1:TEXT 2:PICTURE 3:TABLE 4:LINE 5:PHOTO

FIG. 5B  INPUT FILE INFORMATION

| TOTAL NUMBER OF BLOCKS | N(=6) |
|---|---|

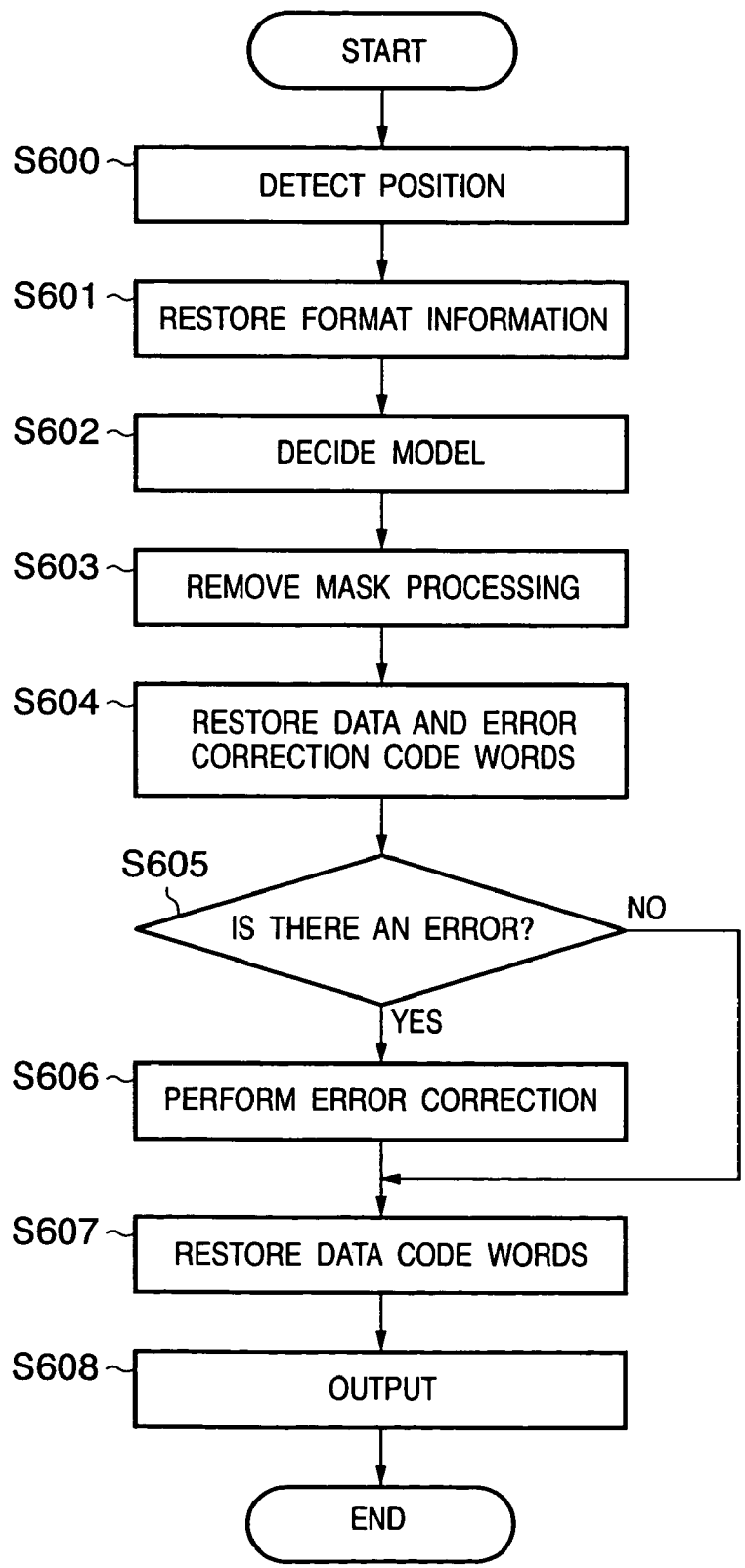

FIG. 13B

| RESULTS OF RETRIEVAL | | | | | |
|---|---|---|---|---|---|
| NUMBER OF BITS | SEARCH LOCATION | | | | |
| 4 | ¥¥FOLDER 1 | | | | |
| | ≪PREVIOUS≫ 1~1 ≪NEXT≫ | | | | |
| THUMBNAIL | DOCUMENT NAME | RANK DISPLAY | SIZE | NUMBER OF PAGES | RECEPTION DATA | engine |
| | REGISTERED DOCUMENT 3 | | 231KB | 1 | 2002/12/10 15:30 | I,F,C |
| | REGISTERED DOCUMENT 2 | | 200KB | 1 | 2003/04/10 15:30 | F,C |
| | REGISTERED DOCUMENT 1 | | 240KB | 1 | 2003/03/30 15:30 | F |
| | REGISTERED DOCUMENT 4 | | 196KB | 1 | 2003/03/20 15:30 | F |

OPEN(O) | DISPLAY FOLDER(F) | STORE RESULTS OF RETRIEVAL(V) | RETRIEVE SIMILAR DOCUMENTS(U) | SEARCH(S) | CLOSE(C)

FIG. 14A

PRECONDITIONS

| INPUT IMAGE | | IMAGE |
|---|---|---|
| WEIGHTING | IMAGE SEARCH | $\alpha$ |
| | FULL-TEXT SEARCH | $\beta$ |
| | CONCEPT SEARCH | $\gamma$ |
| STORAGE LOCATION | | FOLDER 1 |

FIG. 14B

RESULTS OF RETRIEVAL

| REGISTERED DOCUMENTS AT DESIGNATED STORAGE LOCATION | RESULTS OF IMAGE SEARCH | RESULTS OF FULL-TEXT SEARCH | RESULTS OF CONCEPT SEARCH | OVERALL DEGREE OF SIMILARITY | ORDER |
|---|---|---|---|---|---|
| REGISTERED DOCUMENT 1 | D11 | D12 | D13 | $\alpha$D11+$\beta$D12+$\gamma$D13 | 3 |
| REGISTERED DOCUMENT 2 | D21 | D22 | D23 | $\alpha$D21+$\beta$D22+$\gamma$D23 | 2 |
| REGISTERED DOCUMENT 3 | D31 | D32 | D33 | $\alpha$D31+$\beta$D32+$\gamma$D33 | 1 |
| REGISTERED DOCUMENT 4 | D41 | D42 | D43 | $\alpha$D41+$\beta$D42+$\gamma$D43 | 4 |
| REGISTERED DOCUMENT n | Dn1 | Dn2 | Dn3 | $\alpha$Dn1+$\beta$Dn2+$\gamma$Dn3 | n |

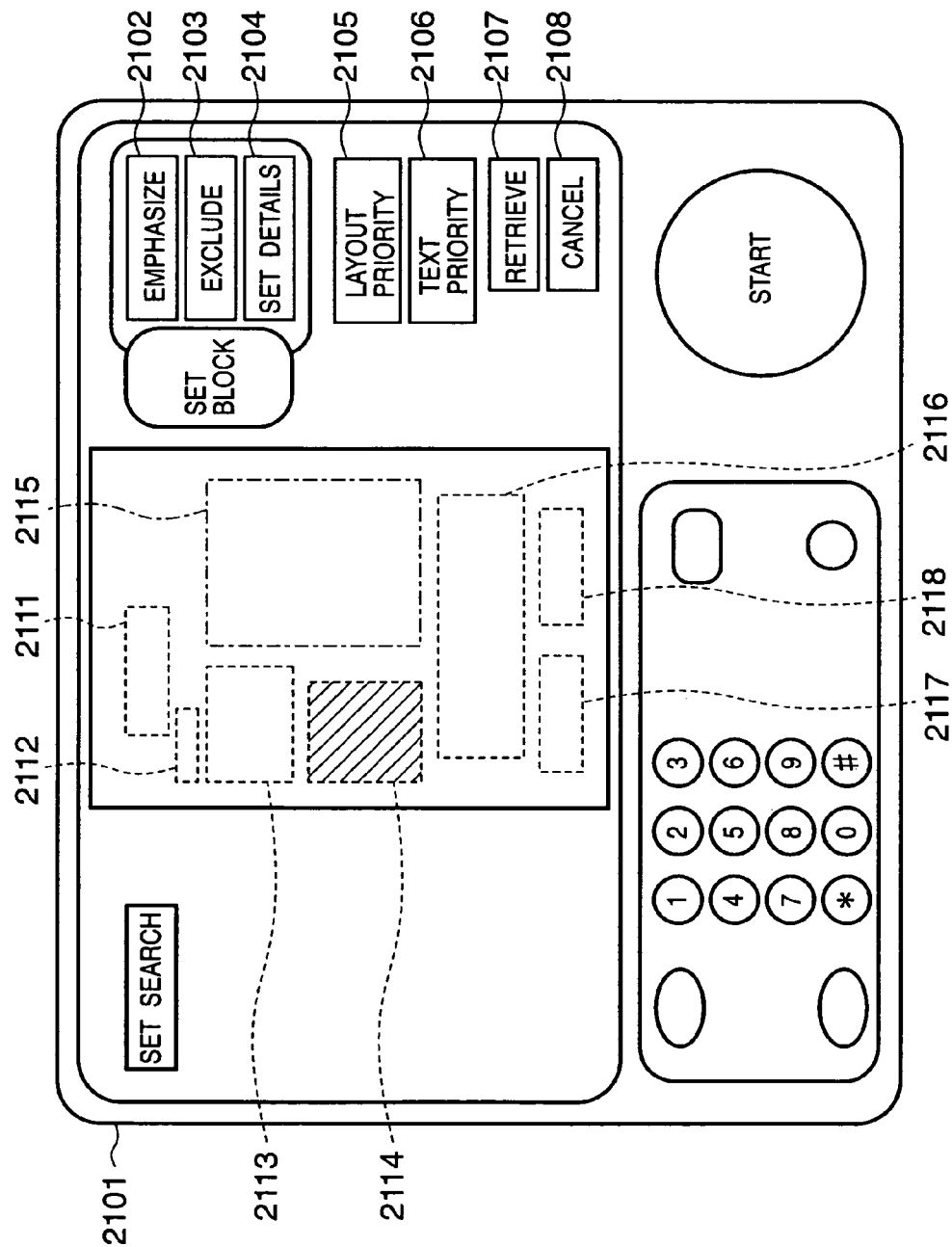

CALCULATING IMAGE SIMILARITY USING EXTRACTED DATA

FIELD OF THE INVENTION

This invention relates to an image retrieval technique whereby image data that resembles an image read by an input device such as a scanner is retrieved from a database.

BACKGROUND OF THE INVENTION

Rapid progress has been made in terms of achieving paperless systems in offices. Paper documents created on a personal computer and old paper documents that have been accumulated in a binder or the like may now be stored in a database by converting these documents to electronic documents such as image data by means of a scanner.

Materials distributed at a meeting even now are preferred to be paper documents, and there are also many opportunities for electronic files that have been stored in a database to be printed out as paper documents which are then delivered to users.

Consider a case where a user who has received a paper document wishes to archive or transmit the document electronically or wishes to extract content from the document and reutilize it. If instead of obtaining an electronic file by putting the paper document back into electronic form it were possible to acquire the original electronic file from a database and utilize this electronic file, then convenience would be enhanced to the extent that loss of information through intermediate use of paper documents is eliminated.

However, devising a query and making a key entry using a personal computer in order to accomplish the above involves considerable labor on the part of the ordinary user.

A system that has been proposed in order to solve this problem reads a paper document by a scanner and retrieves data that is similar in content from a database, as described in the specification of Japanese Patent No. 3017851.

When documents are utilized generally in an office or the like, the content of a document page can be broadly divided into text information and non-text information such as photographs and diagrams. For this reason, the applicant believes that retrieval processing of greater precision can be achieved by executing similarity-degree calculation processing that conforms to the characteristic of the particular information at the time of the search.

For example, the applicant has considered implementing highly precise retrieval processing by utilizing area identification processing of the kind described in the specification of U.S. Pat. No. 5,680,478 to extract a text area and a photograph area from a page image of a scanned document and a page image of a registered document, obtain degree of similarity that is the result of using the feature of a character string that has undergone character recognition processing in regard to the text areas, and obtain degree of similarity that is the result of using image-like features such as color and edges in regard to photograph areas (that is, by finding degree of similarity using different retrieval means depending upon whether an area is a text area or a photograph area).

In particular, a photograph or picture contained in a document page often represents the feature of the page. It can be anticipated that obtaining the degree of similarity of a photograph or picture in highly precise fashion will contribute to a major improvement in the performance of the retrieval system.

In such a retrieval system, however, the documents handled are multifarious and extend from documents having many text attributes to documents having many photograph and line-art attributes, and layout differs greatly from document to document. If the object of a search contains a mixture of documents of widely different layouts, a problem which arises is that using a retrieval method that evaluates uniformly the results of retrieval provided by a plurality of different retrieval means may lower retrieval precision, depending upon the document.

SUMMARY OF THE INVENTION

Accordingly, an object of the present invention is to improve retrieval precision by causing a difference in layout from document to document to be reflected in retrieval at will in a case where degree of similarity between an input image and registered images is obtained using a plurality of retrieval means and a registered image that resembles the input image is retrieved.

According to the present invention, the foregoing object is attained by providing the information processing apparatus having a plurality of retrieval unit adapted to calculate a degree of similarity for each stored image data that is similar to an input document image, comprising:

input unit adapted to input priority information for weighting a degree of similarity calculated by each of the retrieval unit;

calculation unit adapted to calculate overall degrees of similarity between the input document image and each stored image data by weighting, on the basis of the priority information, the degree of similarity which has been calculated by each of the retrieval unit; and display unit adapted to display the similar image data based upon the overall degree of similarity calculated by the calculation unit.

In accordance with the present invention, an improvement in retrieval precision can be realized by causing a difference in layout from document to document to be reflected in retrieval at will in a case where degree of similarity between an input image and registered images is obtained using a plurality of retrieval means and a registered image that resembles the input image is retrieved.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a diagram illustrating an example of area segmentation processing applied to page image data;

FIGS. 5A and 5B are diagrams illustrating block information regarding blocks that have been obtained by block selection processing;

FIG. 6 is a flowchart illustrating a process through which a two-dimensional bar code (QR code symbol) that has been added to a document image is decoded to thereby output a data character string;

FIG. 13B is a diagram illustrating an example of a setting screen on which original electronic files in an order that has been decided are displayed in an image processing system that implements the information processing method of the present invention;

FIGS. 14A and 14B are diagrams illustrating the concept of processing for calculating overall degree of similarity in an image processing system that implements the information processing method of the present invention;

FIG. 21 illustrates an example of a user interface screen in a case where search options have been designated by a user.

DETAILED DESCRIPTION OF THE PREFERRED EMBODIMENTS

Preferred embodiments of the present invention will now be described in detail in accordance with the accompanying drawings.

First Embodiment

Figure 1:
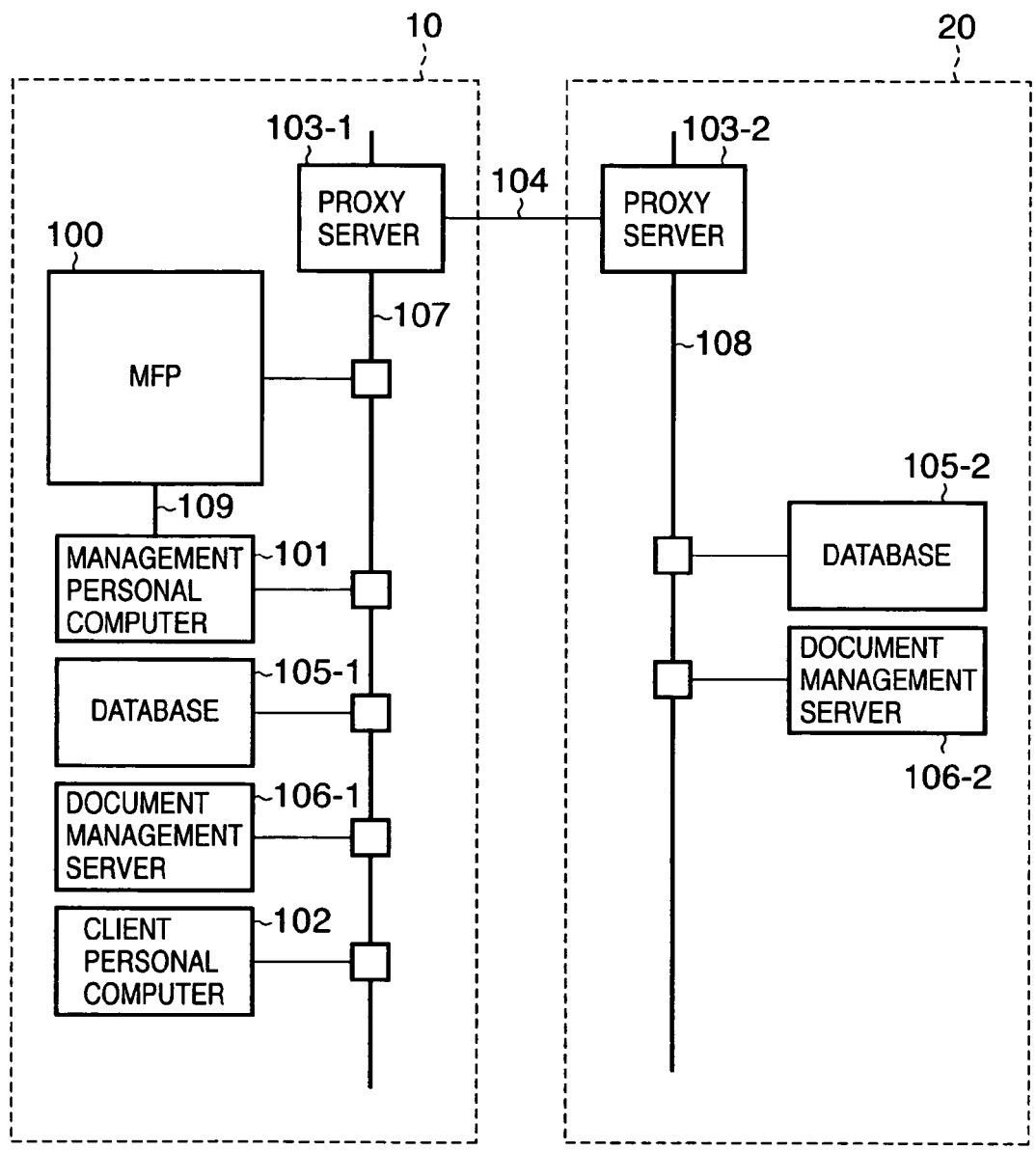
FIG. 1 is a diagram illustrating the configuration of an image processing system for implementing an information processing method according to the present invention.

A first embodiment of the present invention will be described. FIG. 1 is a diagram illustrating the configuration of an image processing system for implementing an information processing method according to the present invention. As shown in FIG. 1, it is assumed that the image processing system for implementing an information processing method according to this invention has been constructed in an environment in which offices 10 and 20 have been connected by the Internet 104.

A LAN 107 has been constructed in the office 10. Connected to the LAN 107 are an MFP 100, a management personal computer 101 for controlling the MFP 100, a client personal computer (having external storage means) 102, a document management server 106-1 and a database 105-1 thereof, and a proxy server 103-1. Similarly, a LAN 108 has been constructed in the office 20. Connected to the LAN 108 are a document management server 106-2 and a database 105-2 thereof. The LAN 107 in office 10 and the LAN 108 in office 20 are connected to the Internet 104 via the proxy servers 103-1, 103-2.

In the image processing system having such a configuration, it is assumed that there is no particular limitation on storage locations of registered images that are the object of retrieval. Images may be stored in a storage device (described later) within the MFP 100, on a hard disk (not shown) within the management personal computer 101 and in a database (105-1) of the document management server 106-1. However, it is assumed that any of the storage locations are externally accessible via the LAN 107 or 108 in such a manner that the registered images thus stored can be retrieved freely.

Further, it is assumed that the information processing method (retrieval function) according to the present invention can be implemented at any device in the image processing system shown in FIG. 1. For example, a data processor (described later) within the MFP 100 may have the retrieval function, the management personal computer 101 may have the retrieval function or the document management server 106-1 may have the retrieval function.

Figure 2:
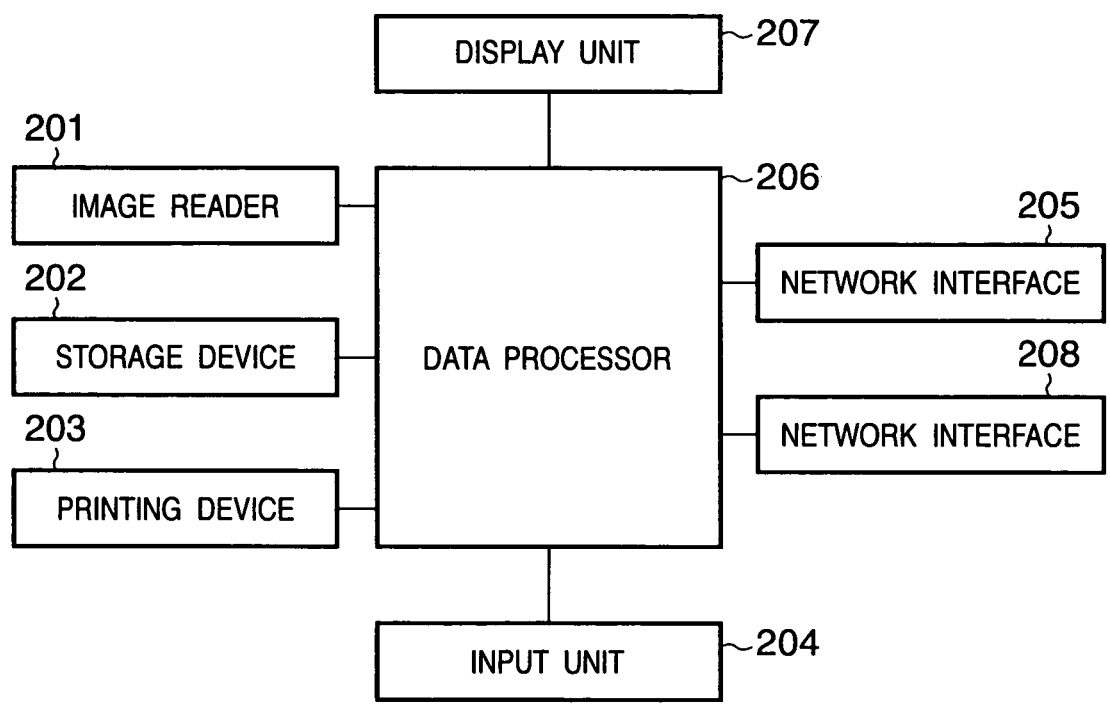
FIG. 2 is a block diagram showing the details of an MFP.

FIG. 2 is a block diagram of the MFP 100. As shown in FIG. 2, the MFP 100 has an image reader 201, which includes an automatic document feeder (referred to as an "ADF" below), for illuminating stacked paper documents or a single paper document by a light source (not shown), forming a reflected image of the document on a solid-state electronic image sensing device by a lens and obtaining a raster image signal from the solid-state electronic image sensing device as 600-dpi image information. In the case of ordinary copying processing, this image signal is converted to a print signal by a data processor 206. If a plurality of sheets are to be copied, then one page of print data is stored temporarily in a storage device 202, after which the data is output to a printing device 203 successively so that the image is printed on paper.

Print data transmitted from the client personal computer 102 via the LAN 107 and a network interface 205 is converted to printable raster data by the data processor 206, after which the print image represented by this data is formed on paper by the printing device 203. Commands from the operator to the MFP 100 are entered via a key control panel (input unit 204) with which the MFP 100 is equipped or via a keyboard and mouse of the management personal computer 101. This series of operations is controlled by a controller (not shown) within the data processor 206.

A display unit 207 presents a display showing the status of operational inputs and a display of image data that is undergoing processing. A storage device 202 also is controlled by the management personal computer 101. Exchange and control of data between the MFP 100 and management personal computer 101 are implemented via a network interface 208 and the directly connected LAN 109.

[Overview of Processing]

Figure 3:
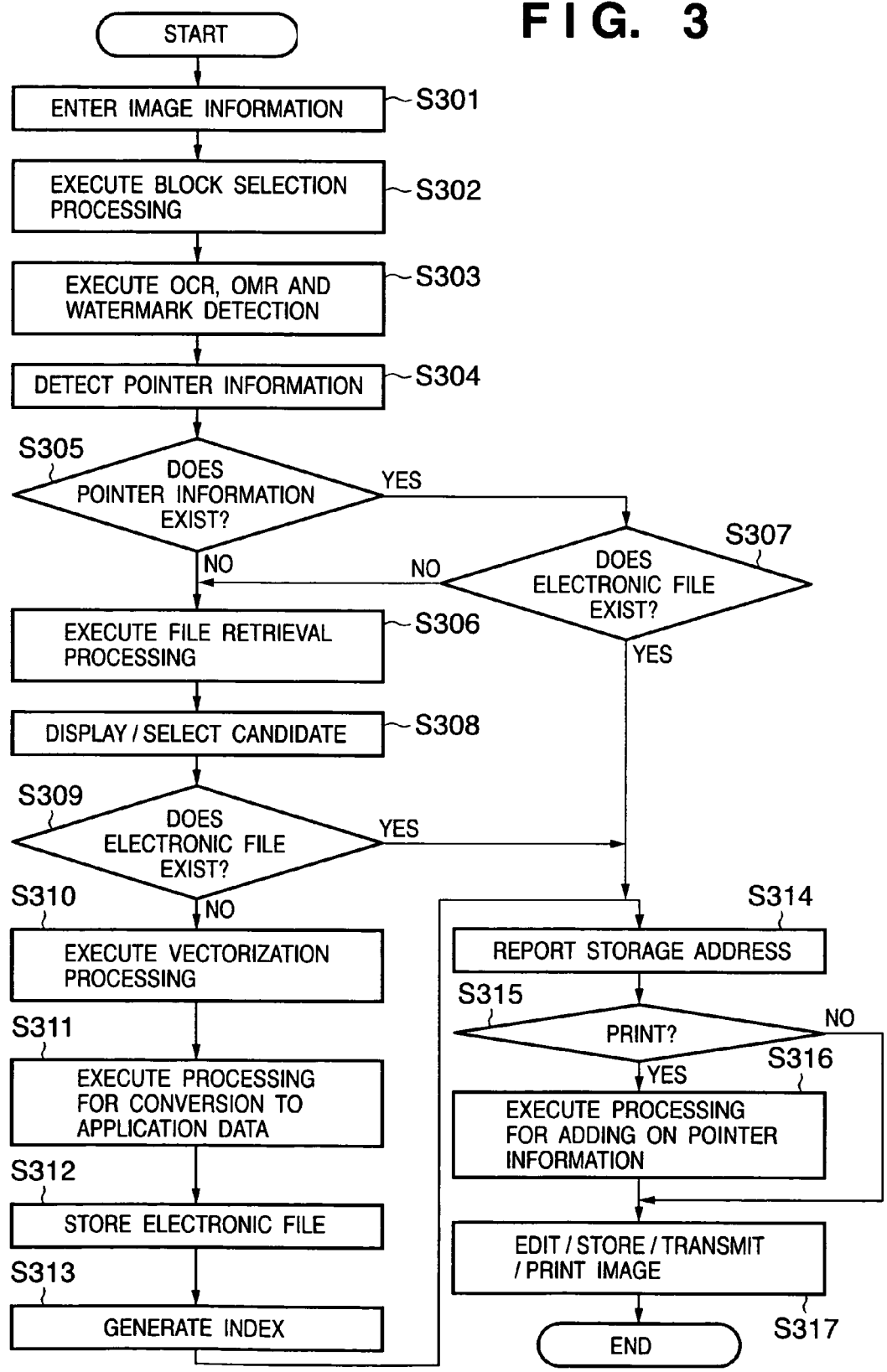
FIG. 3 is a flowchart illustrating the flow of processing in an image processing system that implements the information processing method of the present invention.

Next, reference will be had to FIG. 3 to describe an overview of image processing that includes processing based upon the information processing method of the present invention in the image processing system shown in FIG. 1.

In order to simplify the description, it will be assumed that a database having registered images has been constructed on the hard disk (not shown) of the management personal computer 101 and that the information processing method of the invention is implemented by operating the management personal computer 101 and MFP 100 together.

First, as shown in FIG. 3, the image reader 201 of the MFP 100 is operated, a single document is raster-scanned and a 600-dpi, 8-bit image signal is obtained (step S301). This image signal is pre-processed in the data processor 206 and is stored in the storage device 202 as one page's worth of image data. The CPU of the management personal computer 101 separates the stored image signal into text/line-art portions and halftone image portions and segments the text/line-art portions by further separating them into blocks that are characters grouped on a paragraph basis or into tables and figures that are constructed of lines. The management personal computer 101 segments the image portions expressed by halftones into objects that are independent for each block, such as image portions and background portions of blocks separated into rectangles (step S302).

At this time an object applicable to a two-dimensional bar code or URL recorded in the input image as additional information is detected, an URL is subjected to character recognition using OCR and a two-dimensional bar code is subjected to mark decoding (step S303), whereby pointer information in the storage device storing the original electronic file of the document is detected (step S304). Another method based upon a so-called electronic watermark that is not directly visible to the eye may be employed as means for adding on pointer information. Examples are a method of embedding information in the spaces between characters or embedding information in halftone images.

In a case where pointer information has been detected at step S305, control branches to step S307, where an original electronic file is retrieved from the address indicated by the pointer. In this embodiment, the original electronic file has been stored on the hard disk in the management personal computer 101. This hard disk is searched in accordance with the address information obtained at step S304. It should be noted that the storage location of the original electronic file is not limited to this hard disk. The storage destination may be the hard disk within the client personal computer 102 in FIG. 1, the databases 105-1, 105-2 within the document management servers 106-1, 106-2 connected to the LANs 107, 108 of offices 10 and 20, or the storage device 202 possessed by the MFP 100 per se.

If an original electronic file is not found at step S307, or if the image file is found but is a so-called image file typified by a PDF or tiff, or if pointer information itself does not exist ("NO" at step S305), then control branches to step S306, at which file retrieval processing is executed. So-called compound retrieval processing (the details of which will be described later) is executed at step S306.

If the result of retrieval processing at step S306 is that original electronic files having a high degree of similarity could be found, then thumbnail images or the like are displayed (step S308). If it is necessary for the operator to make a selection from a plurality of original electronic files, the original electronic file is specified by an input operation performed by the operator.

It should be noted that if the candidate is a single file, then control branches automatically from step S309 to step S314, where the storage address is reported. If an original electronic file is not found through the retrieval processing of step S306, or if the file is found but is a so-called image file typified by a PDF or tiff, then control branches to step S310.

Processing for a conversion from raster image data to vector data is executed at step S310, whereby a conversion is made to an electronic file that is close to the original electronic file, easy to edit and small in capacity. By virtue of such processing, the amount of information is reduced, storage efficiency enhanced and transmission time shorted in comparison with a case where image data is used. In addition, when the file is printed or displayed, it is outstanding as high-quality data.

After vectorization is applied to each block at step S310, layout information of the document is exploited to effect a conversion to, for example, RTF (Rich Text Format) (step S311) and the input image is stored in the storage device 202 as an original electronic file (step S312).

In order that the vectorized input image can be retrieved directly as an original electronic file when similar retrieval processing is executed from this point onward, index information for search purposes is generated at step S313 and added onto an index file for search purposes. The storage address of this original electronic file is then reported to the operator at step S314.

Similarly, in a case where an original electronic file could be specified from pointer information at step S307 ("YES" at step S307) and a case where an original electronic file could be specified by file retrieval processing ("YES" at step S309), the storage address of the original electronic file is reported to the operator (step S314).

If it is determined at step S315 that processing desired by the operator is printing, then control branches to step S316, where the pointer information is appended to the file as image data. Control then proceeds to step S317, at which various processing such as image editing, storage, transmission and printing is executed.

Each processing step illustrated in the flowchart of FIG. 3 will now be described in detail. The block selection processing indicated at step S302 will be described first.

[Block Selection Processing (Step S302)]

As shown in FIG. 4, block selection processing is processing for recognizing one page of image data, which has been read at step S301, as clusters of data on a per-object basis, discriminating each block as any of the attributes of text, a picture, a photograph, a line or a table, etc., and segmenting the data into areas having different attributes. An embodiment of block selection processing will be described below.

First, an input image is binarized into a monochrome image and the contour of the image is traced to thereby extract a cluster of pixels bounded by an outline of black pixels. In clusters of black pixels of large area, white pixels within the cluster are also subjected to contour tracing to extract clusters of white pixels. Clusters of black pixels are further extracted recursively from within white-pixel clusters larger than a certain area.

Clusters of black pixels thus obtained are classified according to size and shape and are categorized into areas having different attributes. For example, clusters having as aspect ratio close to unity and a size that falls within a certain range are adopted as pixel clusters corresponding to characters, and portions in which closely adjacent characters can be grouped with good alignment are adopted as text areas. Flat pixel clusters are adopted as line areas. A zone greater than a certain size and rectangular in shape and occupied by black-pixel clusters that envelop white-pixel clusters in good alignment is adopted as a table area. Areas in which irregularly shaped pixel clusters are dispersed are adopted as photograph areas. Pixel clusters of any other shape are adopted as picture areas.

The block information relating to each of the blocks obtained by block selection processing is illustrated in FIGS. 5A and 5B. The block-by-block information is vectorized as described below or used as information for search purposes.

[Detection of Pointer Information (Step S304)]

Next, pointer information detection processing (step S304) for extracting a storage location of an original electronic file from image inform will be described.

Figure 7:
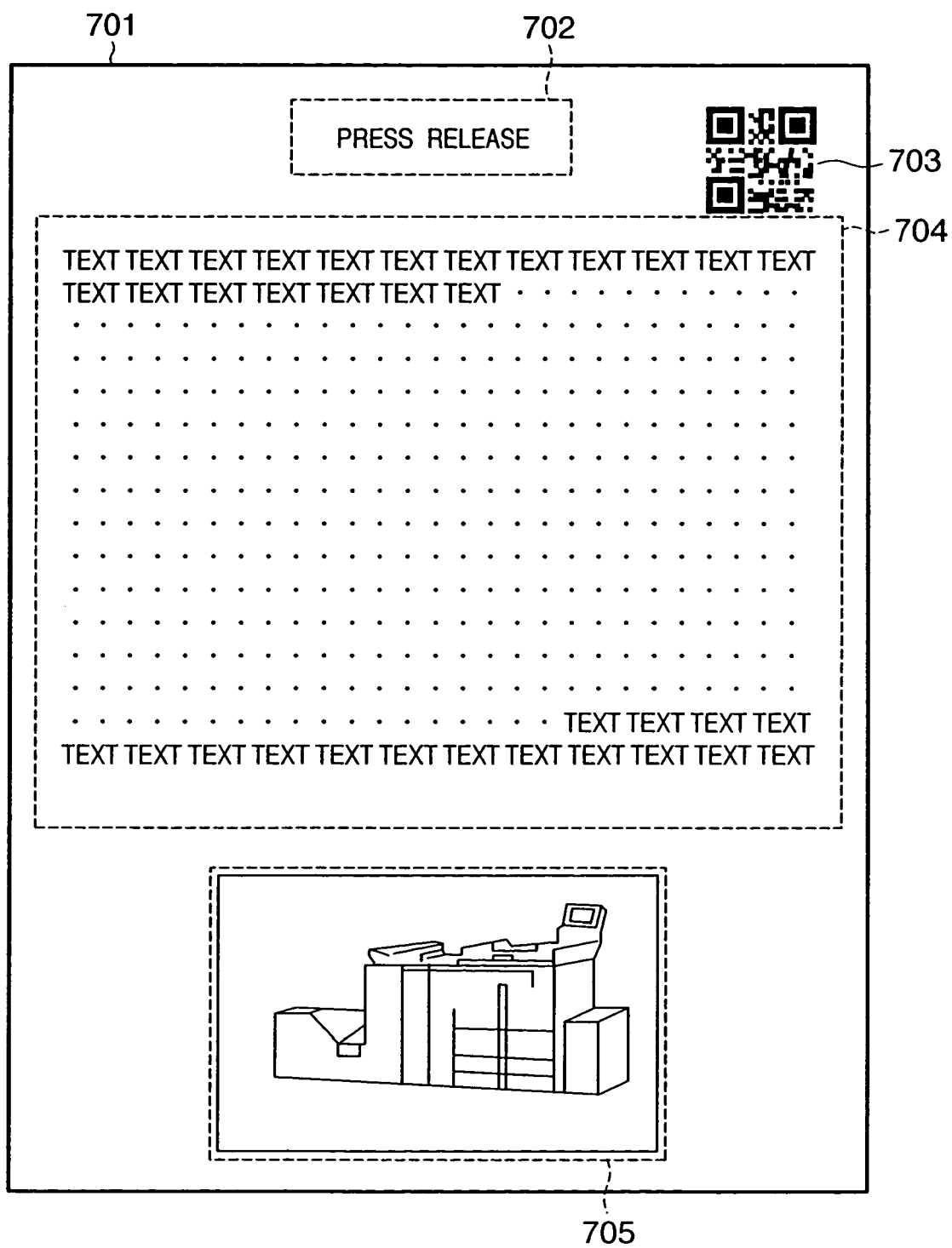
FIG. 7 illustrates an example of a document to which a two-dimensional bar code has been added.

FIG. 6 is a flowchart illustrating a process for decoding a two-dimensional bar code (QR code symbol), which has been appended to an input image, and outputting a data character string. FIG. 7 illustrates an example of a document to which a two-dimensional bar coded has been appended.

First, an input image representing a document 701 that has been stored in a page memory within the data processor 206 is scanned by a CPU (not shown) and the position of a prescribed two-dimensional bar code symbol 703 is detected (step S600) from the result of the block selection processing described earlier. The QR-code position detection pattern is composed of identical position detection element patterns disposed at three of the four corners of the symbol.

Next, format information adjacent the position detection pattern is restored and an error correction level, which has been applied to the symbol, and a master pattern are obtained (step S601).

After the symbol model is decided (step S602), the bit pattern of the encoded area is subjected to an exclusive-OR operation using the master pattern obtained from the format information, thereby removing mask processing (step S603).

Furthermore, a symbol character is read in accordance with a placement rule that corresponds to the model and message data and error correction code words are restored (step S604).

Whether there is an error on a restored code is detected (step S605). If an error is detected, processing branches to step S606 and the error is corrected.

Data code words are divided into segments (step S607) based upon mode indicators and character-count indicators of the error-corrected data.

Finally, data characters are decoded based upon specifications mode and the results are output (step S608).

It should be noted that data incorporated in a two-dimensional bar code represents address information of the corresponding original electronic file. For example, the data is composed of path information comprising a file server name and a file name, or an URL leading to the corresponding original electronic file.

This embodiment has been described in regard to the document 701 to which the pointer information has been appended by a two-dimensional bar code. However, in a case where pointer information is recorded directly as a character string, the block of a character string that is in conformity with a predetermined rule can be detected by the previous block selection processing and each character of the character string indicating the pointer information can be subjected to character recognition, thereby directly obtaining address information of the original electronic file.

Further, the character string of the text block 702 or 704 in the document 701 of FIG. 7 can be provided with pointer information by adding modulation to a degree that is difficult to see in the spacing between mutually adjacent characters and embedding information between these characters. If so-called watermark information is detected in the spacing between characters when character recognition processing (described below) is executed, then pointer information is obtained. It is also possible to add pointer information to a natural picture 705 in the form of an electronic watermark.

[Processing for Searching Original Electronic Files from Pointer Information]

Figure 8:
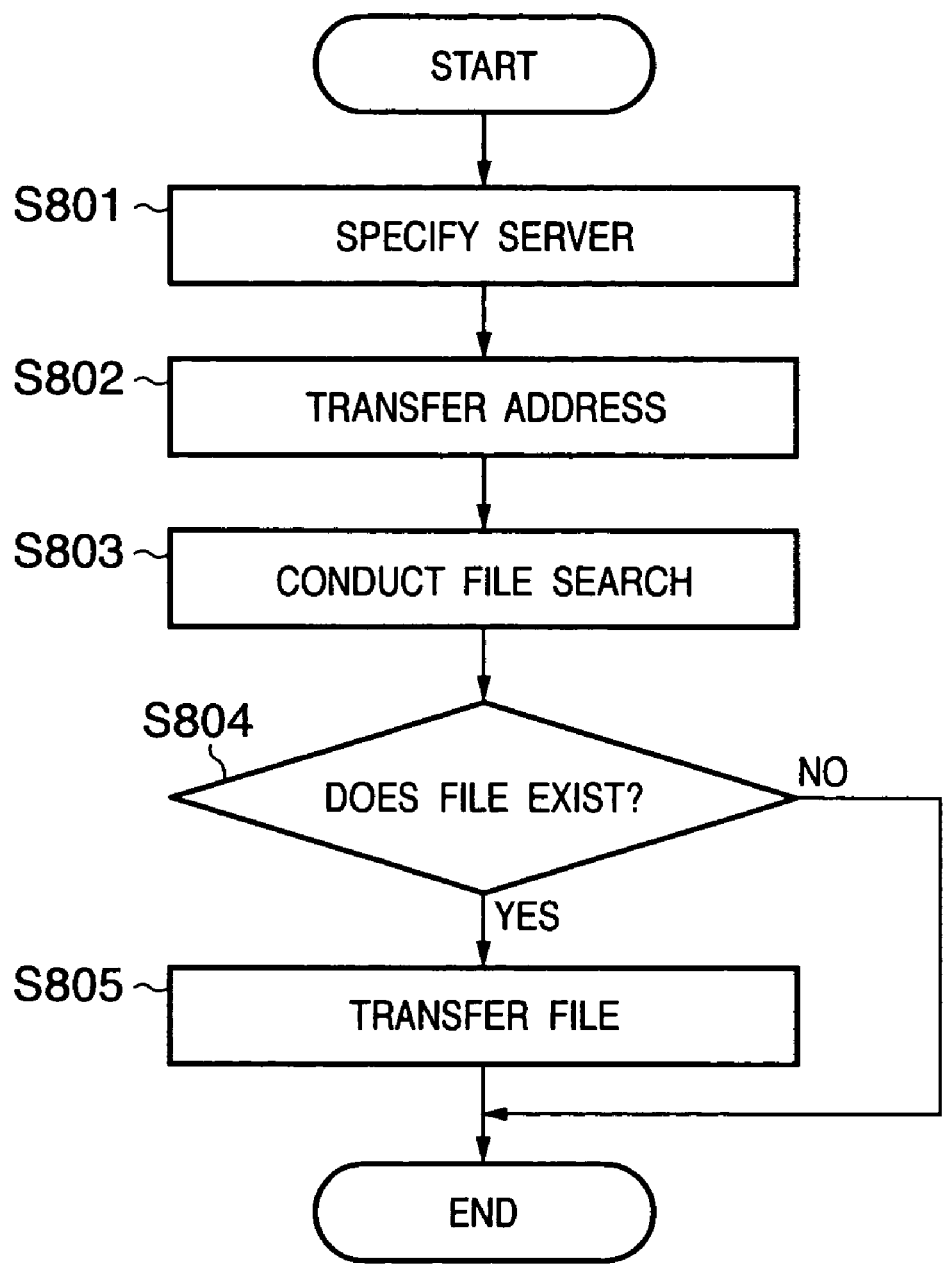
FIG. 8 is a flowchart illustrating the flow of processing regarding retrieval of an original electronic file from pointer information.

Steps S305 and S307 in FIG. 3 will be described next. Processing for searching original electronic files from pointer information will be described with reference to the flowchart of FIG. 8.

A file server is specified based upon an address contained in pointer information (step S801). In this embodiment a file server signifies the hard disk within the management personal computer 101. However, if the storage destination of an original electronic file is the client personal computer 102, the database 105-1 or 105-2 of the document management server 106-1 or 106-2 or the storage device 202 in the MFP 100, then the file server would signify this destination. Further, an address is an URL or path information that comprises a server name and file name.

If a file server can be specified, an address is transferred to the file server (step S802). Upon receiving the address, the file server conducts a search for the original electronic file (step S803). If the original electronic file does not exist ("NO" at step S804), then this is reported to the MFP 100.

If the original electronic file does exist ("YES" at step S804), then, as described in FIG. 3, the address of the original electronic file is reported (step S314). If the processing desired by the user is acquisition of image file data, then the original electronic file is transferred to the MFP 100 (step S805).

[Compound Retrieval]

The details of file retrieval processing (compound retrieval) and candidate display/selection processing indicated at steps S306 and S308, respectively, which constitute the principal objective of the present invention, will now be described with reference to FIGS. 12 to 14B.

First, compound retrieval is premised on the fact that an index file for each search has been generated (no particular description will be rendered in regard to index generation.)

Figure 12:
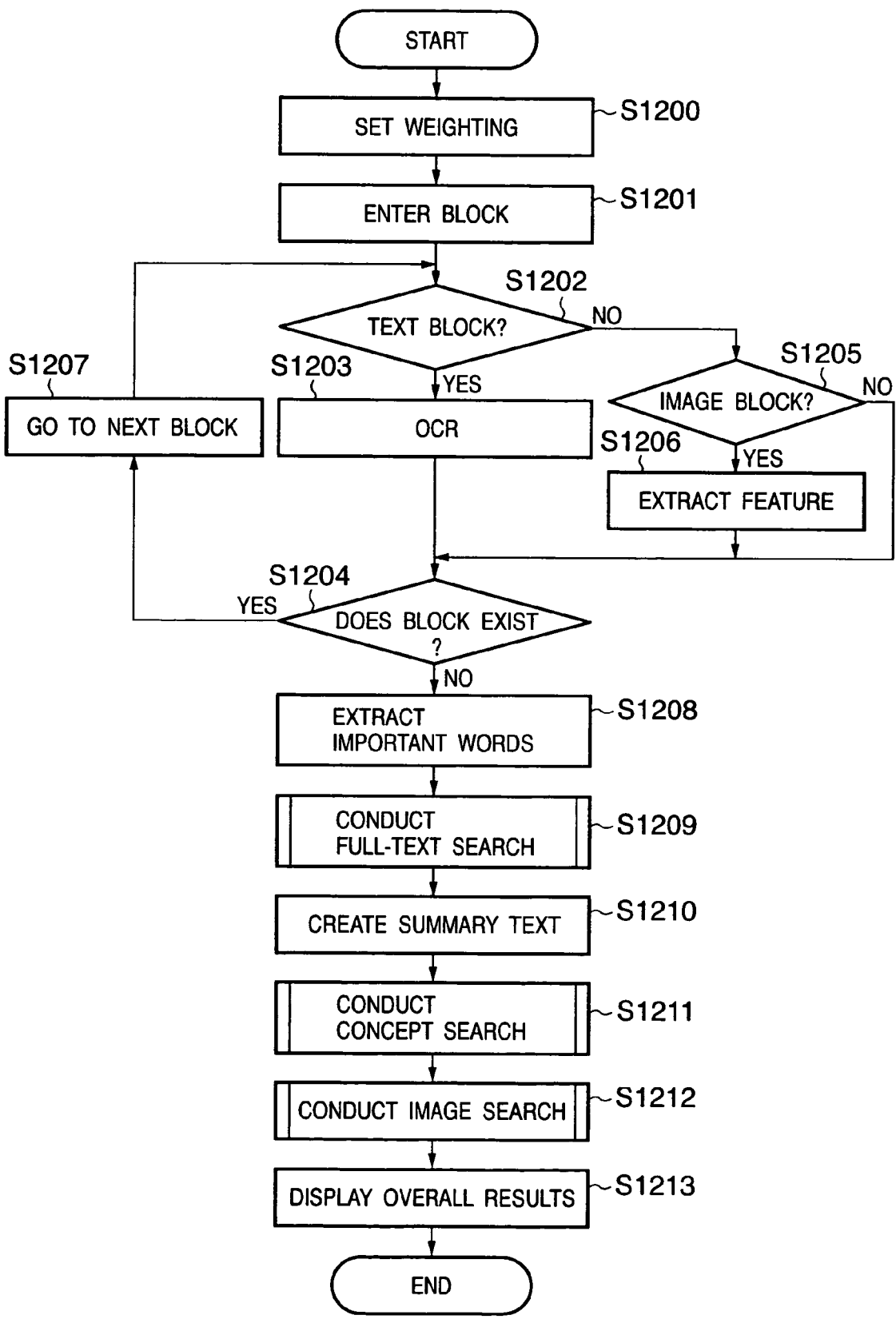
FIG. 12 is a flowchart illustrating the flow of retrieval processing in an image processing system that implements the information processing method of the present invention.
Figure 13A:
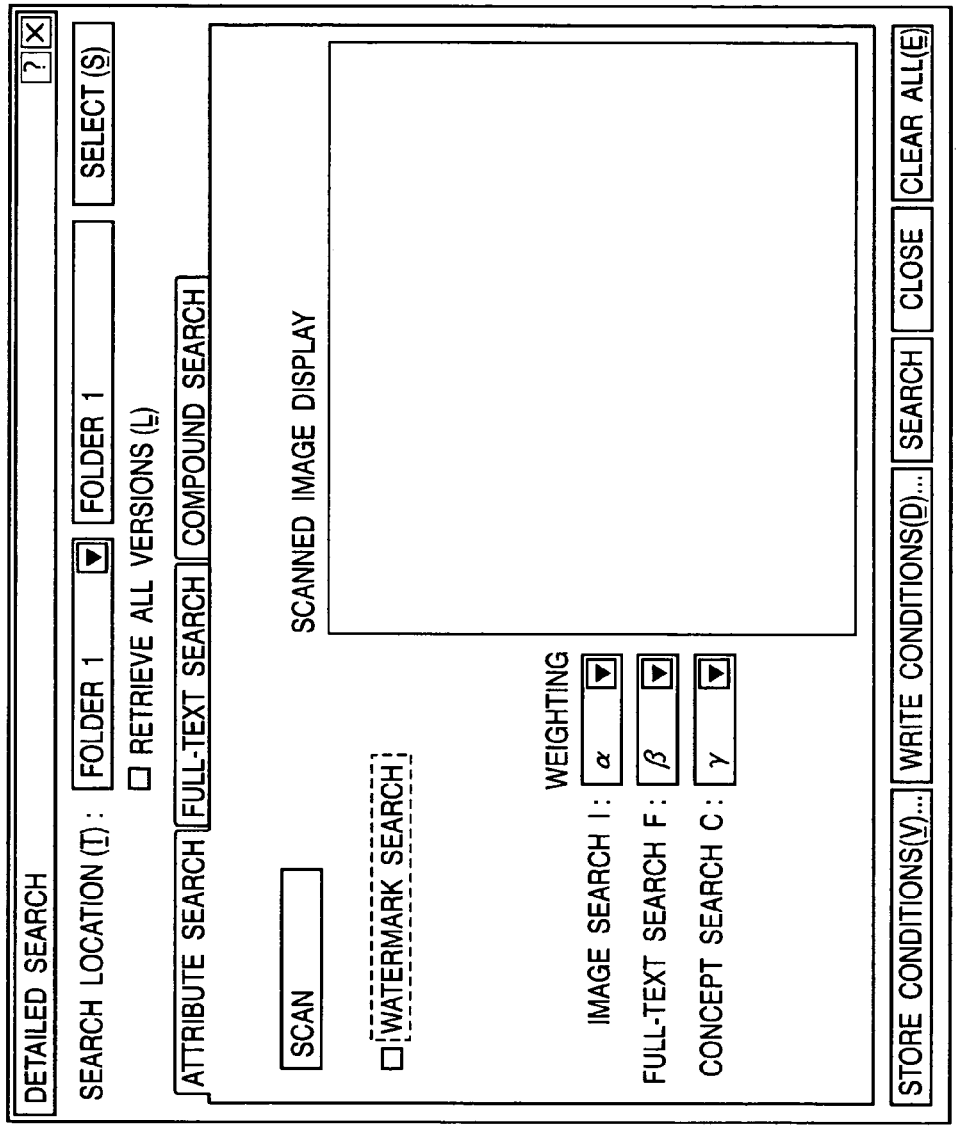
FIG. 13A is a diagram illustrating an example of a setting screen for weighting a retrieval method in an image processing system that implements the information processing method of the present invention.

As shown in FIG. 12, first a screen for setting the weighting of each search method beforehand is displayed at step S1200 to prompt an entry from the user. FIG. 13A illustrates an example of the setting screen. It is so arranged that weightings of a full-text search, concept search and image search can be set.

After the weightings have been set, each block that has been extracted by the above-described block selection is entered at step S1201. Next, at step S1202, it is determined whether the particular block is a text block. If the block is a text block, OCR processing is executed at step S1203 and control proceeds to step S1204. If the block is not a text block, on the other hand, then control proceeds to step S1205, where it is determined whether the block is an image block.

If the block is an image block, prescribed features are extracted from the block (use is made of the optimum combination of a feature relating to color such a color histogram or color moment, a texture feature expressed by a co-occurrence matrix, contrast, entropy or a Gabor transform, and a shape feature such as a Fourier descriptor) at step S1206. Control then proceeds to step S1204. If the block is not an image block, then control proceeds to step S1204.

It is determined at step S1204 whether there is a next block. If there is a next block, then the pointer is advanced to the next block at step S1207 and control from step S1202 onward is repeated. If there are no further blocks in the input image, then control proceeds to step S1208.

Keywords are extracted at step S1208 from the text that was encoded at step S1203, then a comparison is made with a prescribed indexes (full-text search indexes created from text information of electronic files that have been stored in a database, by way of example) at step S1209 by a full-text search technique, and files that are similar to the input image as well as the degrees of similarity thereof are sought within these limits.

Summary text is generated at step S1210 from the text that was encoded at step 1203, then a comparison is made with prescribed indexes (concept search indexes created from text information of electronic files that have been stored in a database, by way of example) at step S1211 by a concept search technique, and files that are similar to the input image as well as the degrees of similarity thereof are sought within these limits.

The features that were extracted at step S1206 are compared with prescribed indexes at step S1212 by an image search technique, and files that are similar to the input image as well as the degrees of similarity thereof are sought within these limits.

The degrees of similarity are adjusted in accordance with the weightings, which were set at step S1200, of the results obtained at steps S1209, S1211 and S1212, the final order of the files is decided and this is displayed at step 1213. An example of the display screen is illustrated in FIG. 13B. The launch conditions (status of use) of each of the search techniques and the overall degrees of similarity are sorted and displayed together with the file names, as illustrated in FIG. 13B.

In FIG. 13B, the types of search techniques that have had an effect upon the search results (the search techniques used) are indicated by letters of the alphabet in an "engine" column (where I represents an index search, F a full-text search and C a concept search), and the overall degrees of similarity are indicated by bar graphs in a "RANK DISPLAY" column. It should be noted that the type of search technique may be indicated in a form other than the alphabet (for example, in the form of an icon) and that the "RANK DISPLAY" may be indicated in a form other than a bar graph (for example, in the form of a numerical value). Of course, it is also possible display jointly the details of the degree of similarity associated with each search technique.

FIGS. 14A and 14B illustrate the concept of calculation processing for calculating overall degree of similarity. FIG. 14A illustrates a list of search conditions that have been entered on the setting screen shown in FIG. 13A. FIG. 14B illustrates results obtained by calculating overall degree of similarity based upon these conditions. As illustrated in FIG. 14B, degrees of similarity (D11, D12, . . . ) obtained by conducting an image search, full-text search and concept search are calculated for each of original electronic files (REGISTERED DOCUMENT 1, REGISTERED DOCUMENT 2, . . . ) held in designated search locations. Overall degree of similarity is found by subjecting these degrees of similarity to weighting set in advance. For example, in the case of REGISTERED DOCUMENT 1 in FIG. 14B, degree of similarity based upon the image search is D11, degree of similarity based upon the full-text search is D12, degree of similarity based upon the concept search is D13, and overall degree of similarity is calculated as $\alpha \times D11 + \beta \times D12 + \gamma \times D13$.

[Vectorizatioin Processing]

If original electronic files do not exist in a file server, then the image data is vectorized block by block.

Vectorization processing indicated at step S310 will now be described in detail. First, character recognition processing is applied to each character in a text block.

(Character Recognition)

In character recognition processing, an input image that has been cut out in character units is subjected to recognition using a pattern matching technique to obtain the corresponding character code. Character recognition processing includes comparing an observation feature vector, which is the result of converting a feature obtained from a text image to a numerical-value sequence of several tens of dimensions, and a dictionary feature vector obtained in advance for every character type, and adopting the character type having the shortest distance as the result of recognition. Various well-known methods are available for extracting feature vectors. For example, one method is to divide text into meshes and adopt as a feature a vector the number of dimensions of which is the number of meshes, where this is obtained by counting character lines in each mesh as line elements according to direction.

In a case where character recognition is applied to a text area that has been extracted by block selection processing (step S302), first it is determined whether the writing in the area is horizontal or vertical, a line is cut out in each corresponding direction and then a character is cut out to obtain the character image. The determination of horizontal or vertical writing may be performed by taking a horizontal/vertical projection with respect to pixel values within the area, determining that an area is a vertical-writing area if the variance of the horizontal projection is large and determining that an area is a horizontal-writing area if the variance of the vertical projection is large. Decomposition into character strings and characters is performed by cutting out a line by utilizing a projection in the horizontal direction in case of horizontal writing and cutting out characters from the projection in the vertical direction with respect to the line that has been cut out. With regard to a text area of vertical writing, it will suffice to reverse the horizontal and vertical directions. At this time character size can be detected.

(Font Recognition)

A plurality of dictionary font vectors for the types of characters used when performing character recognition are prepared for each type of character shape, that is, for each font type, and font type is output together with the character code at the time of matching, whereby the character font can be recognized.

(Vectorization of Characters)

By using a character code and font information obtained by character recognition and font recognition, information of a text portion is converted to vector data by employing outline data prepared in advance. In a case where the input image is a color image, the color or each character is extracted from the color image and is recorded together with vector data.

Image information that belongs to a text block can be converted to vector data of faithful shape, size and color by the above-described processing.

(Vectorization of Portions other than Text)

Figure 10:
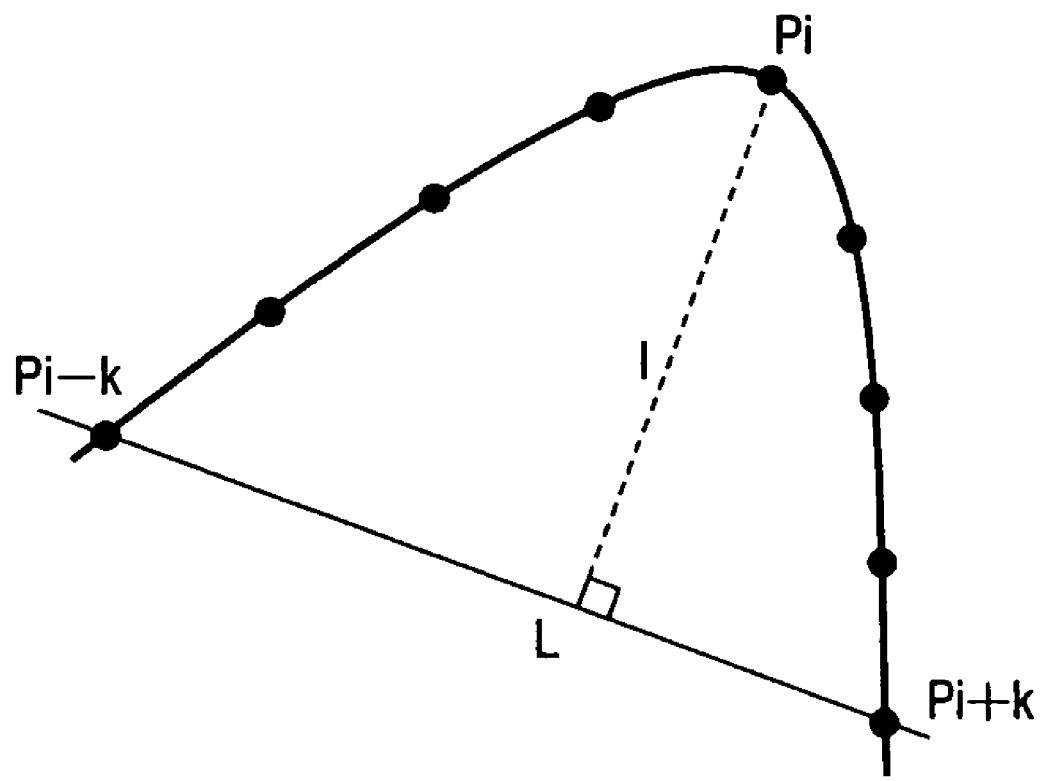
FIG. 10 is a diagram useful in describing an overview of block selection processing.

The contour of a pixel cluster extracted in an area is converted to vector data, where the area of interest is found to be the area of a picture, line or table at the block selection processing of step S302. Specifically, a point sequence of pixels forming the contour is demarcated at points regarded as angles, and each interval is approximated by a partial straight line or curve. An angle is a point at which curvature is maximum. When a chord is drawn between points $Pi-k$ and $Pi+k$ of k-number of points on left and right sides of any point Pi, as shown in FIG. 10, a point at which curvature is maximum is obtained as a point for which the distance between the chord and point Pi is maximum. If we let R represent the length of the chord or the length of the arc between $Pi-k$ and $Pi+k$, then the point at which the value of R falls below a threshold value can be regarded as an angle. If it is a straight line, the interval after partitioning by the angle can be vectorized using the method of least squares, etc., applied to the point sequence. If it is a curve, the interval after partitioning by the angle can be vectorized using a three-dimensional Laplacian function, etc.

Further, in a case where the object of interest is an internal contour, it is similarly approximated by a partial straight line or curve using the point sequence of the white-pixel contour extracted by block selection processing.

Thus, if an approximation of a demarcated segment of a contour is used, then the outline of a figure having any shape can be vectorized. If the input image is a color image, the color of figure is extracted from the color image and is recorded together with the vector data.

Figure 11:
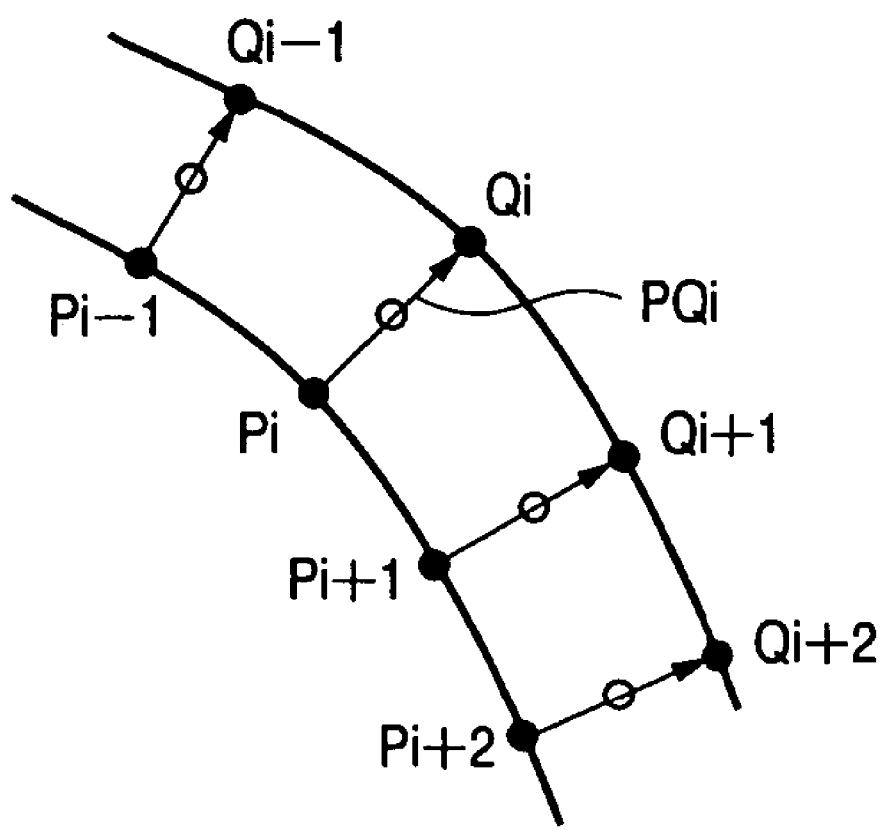
FIG. 11 is a diagram illustrating an example of vectorization processing.

Furthermore, in a case where an external contour and an internal contour or other external contour are close together over a certain interval, as shown in FIG. 11, the two contour lines can be consolidated and can be expressed as a line having thickness. More specifically, if a line is drawn from each point Pi on a certain contour to a point Qi that is the smallest distance away on the other contour and each distance PQi is on average less than a certain length, then the interval of interest is approximated by a straight line or curve with the mid-point of PQi serving as a point sequence and the thickness thereof is made the average value of PQi. A ruled line in a table, which is a line or a collection of lines, can be expressed as a vector efficiently in the form of a collection of the above-mentioned lines having thickness.

Vectorization using character recognition processing applied to a character block has already been described. As the result of character recognition processing, a character having the shortest distance from a dictionary is used as the result of recognition. However, if the distance is greater than a predetermined value, there are many cases where the character does not necessarily match the original character and may be recognized erroneously as being a character having a similar shape. In the present invention, therefore, such a character is handled as being the same as an ordinary line drawing and the character is outlined in the manner described above. That is, with regard to a character that gives rise to mistaken recognition in character recognition processing, vectorization based upon outlining that is visually faithful to the image data can be performed without vectorizing the mistaken character.

Further, with regard to a block judged to be a photograph, the present invention adopts the image data as is because vectorization cannot be carried out.

[Processing for Conversion to Application Data]

Figure 15:
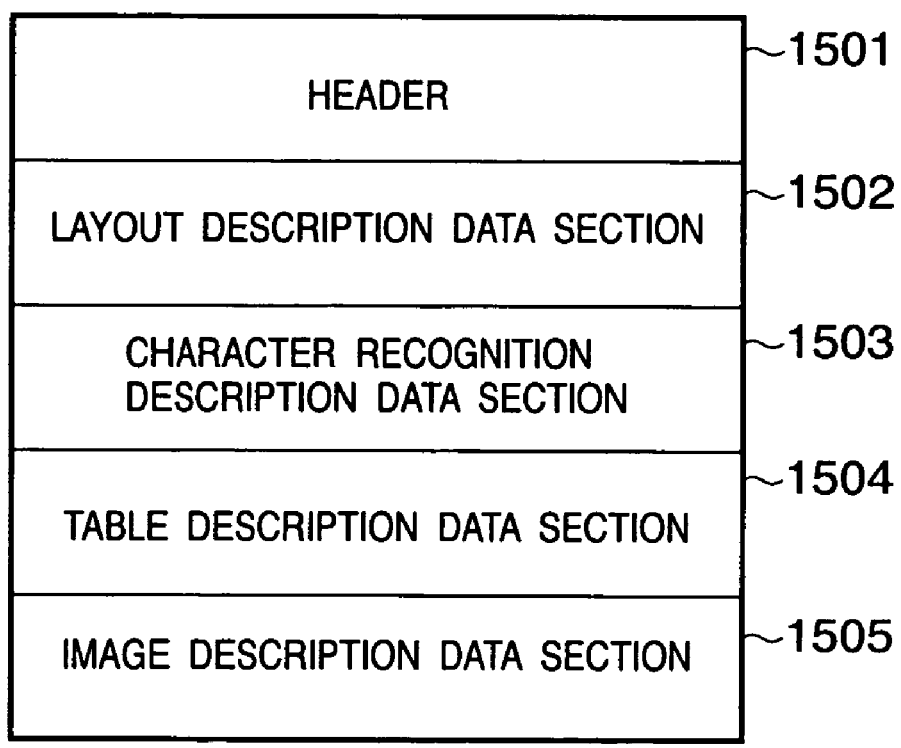
FIG. 15 is a diagram illustrating an example of an original electronic file that has undergone vectorization processing.

One page of image data is subjected to block selection processing (step S302) and the result of applying vectorization processing (step S310) is converted as a file in an intermediate data format of the kind shown in FIG. 15. This data format is referred to as a Document Analysis Output Format (DAOF).

FIG. 15 is a diagram illustrating the data structure of the DAOF. As shown in FIG. 15, the DAOF includes a header 1501, which holds information relating to an input image to be processed. A layout description data section 1502 holds attribute information and rectangle address information of each block recognized for every attribute in the input image such as TEXT, TITLE, CAPTION, LINE ART, PICTURE, FRAME and TABLE. A character recognition description data section 1303 holds results of character recognition obtained by applying character recognition to TEXT blocks such as TEXT, TITLE and CAPTION. A table description data section 1504 stores the details of the structure of a TABLE block. An image description data section 1505 cuts out image data of a block such as PICTURE or LINE ART from the input image.

There are also cases where such a DAOF is stored not only as intermediate data but also upon being put into file form itself. In the file state, however, individual objects cannot be reutilized by a so-called general document creating application. Next, processing for effecting a conversion from this DAOF to application data (step S311) will be described.

Figure 16:
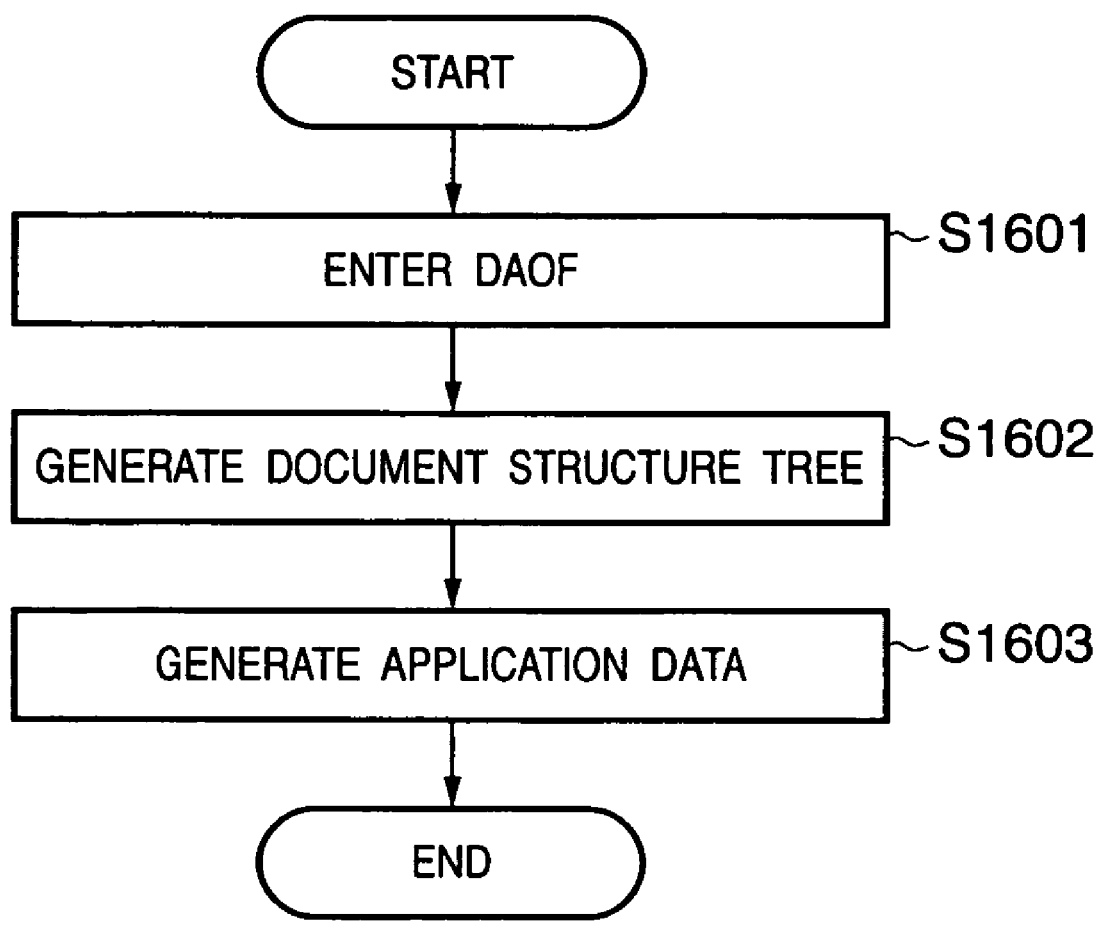
FIG. 16 is a flowchart illustrating the flow of processing for performing a conversion to application data.

FIG. 16 is a flowchart illustrating the flow of processing (step S311) for effecting a conversion to application data.

The DAOF data is input at step S1601. A document structure tree that is the basis of application data is generated at step S1602. The actual data in the DAOF is read in and the actual application data is generated based upon the document structure tree at step S1603.

Figure 17:
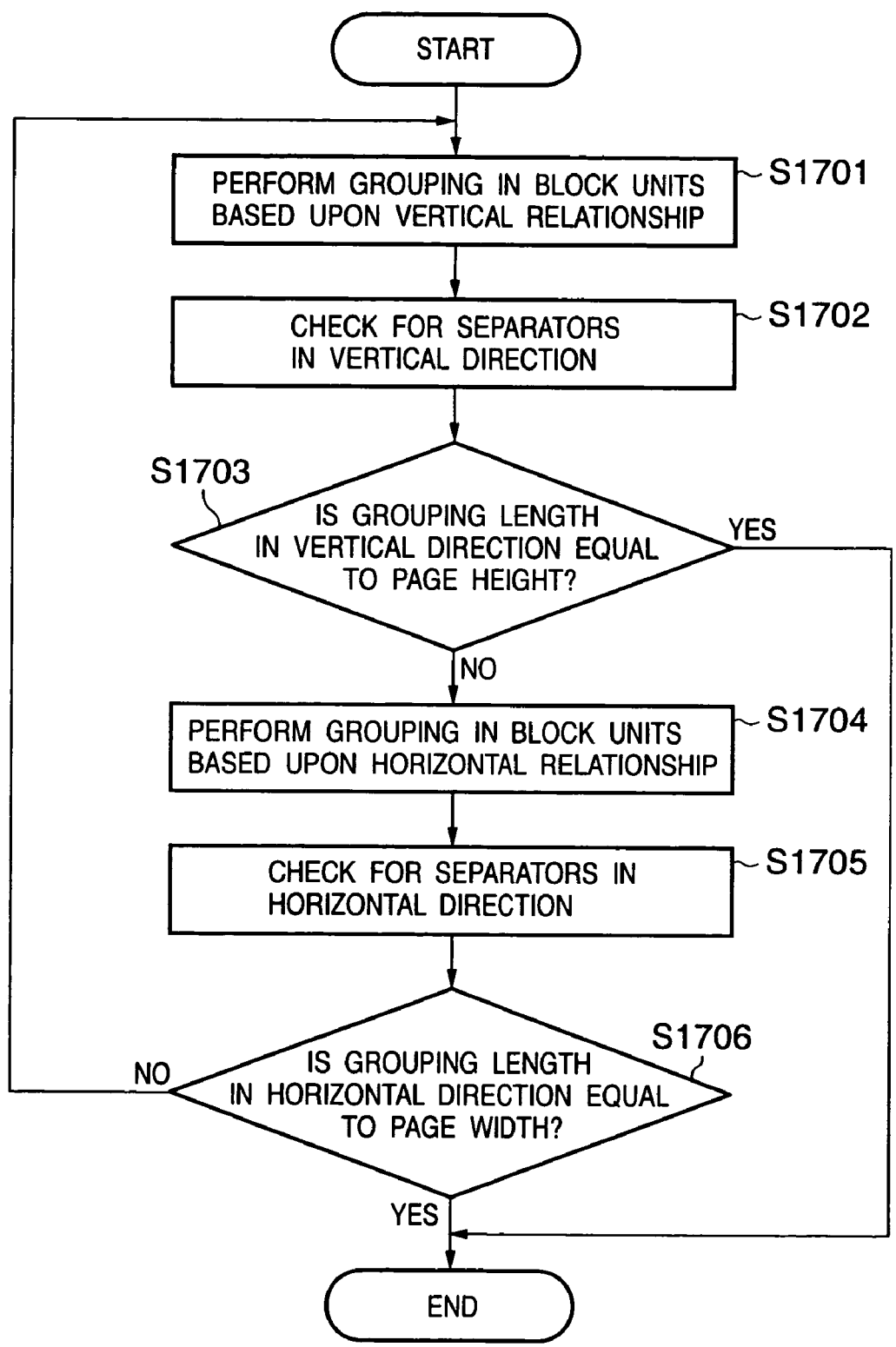
FIG. 17 is a flowchart illustrating the flow of processing for generating a document structure tree.
Figure 18A:
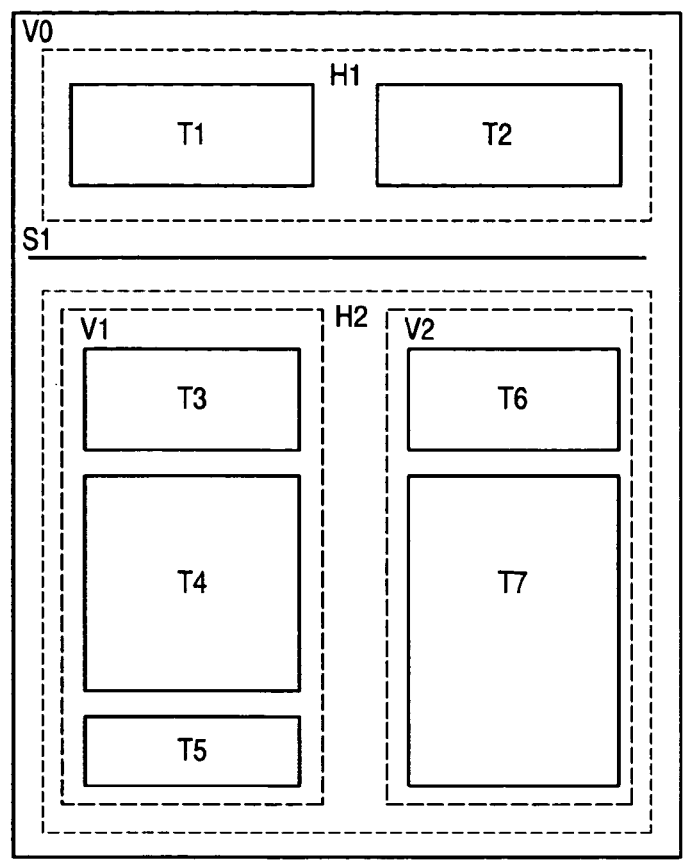
FIGS. 18A and 18B are diagrams useful in describing the document structure tree.
Figure 18B:
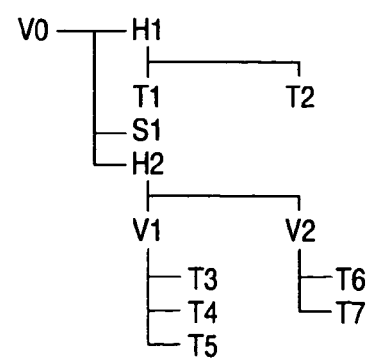

FIG. 17 is a flowchart illustrating in detail the flow of processing (step S1602) for generating a document structure tree. FIGS. 18A and 18B are diagrams useful in describing the structure of a document structure tree. The flow of processing undergoes a transition from a microblock (a single block) to a macroblock (a set of blocks) as a basic rule of overall control.

A block hereinafter signifies a microblock and the entirety of a macroblock. Regrouping is performed in block units at step S1701 based upon a relationship among the blocks in the vertical direction. After the start of processing, determination is performed in microblock units.

The relationship mentioned here can be defined to mean that distance between blocks is short and block width (height in the case of the horizontal direction) is substantially the same. Further, information such as distance, width and height is extracted by referring to the DAOF.

FIG. 18A illustrates actual page organization and FIG. 18B is the document structure tree thereof. As a result of the processing at step S1701, T3, T4 and T5 are generated as one group V1, and T6, T7 are generated as one group V2, which is a group of the same hierarchical layer.

Whether or not a separator is present in the vertical direction is checked at step S1702. Physically speaking, a separator is an object having a line attribute in the DAOF. In logical terms, a separator is an element that clearly divides a block in the application. If a separator is detected, then a block is re-divided at the same layer.

Whether or not divisions greater than above can exist is determined utilizing group length at step S1703. If group length in the vertical direction is equal to the page height, then generation of the document structure tree is terminated.

In the case of FIGS. 18A and 18B, there is no separator and the group height is not the page height. Control therefore proceeds to step S1704. Here regrouping is performed in block units based upon a relationship in the horizontal direction. Here also the first operation immediately after start-up is to perform a determination in microblock units. The definitions of relationship and determination information are the same as those for the vertical direction.

In the case of FIGS. 18A and 18B, H1 is generated as a group composed of T1, T2, and H2 is generated as a group composed of V1, V2. The group H1 is of the same hierarchical layer and is one layer above the group H2.

Whether or not a horizontal separator is present is checked at step S1705. In FIGS. 18A and 18B, S1 is a horizontal separator and therefore this is registered in the tree and a layer composed of H1, S1, H2 is generated.

Whether or not divisions greater than above can exist is determined utilizing group length at step S1706. If group length in the horizontal direction is equal to the page width, then generation of the document structure tree is terminated. If this is not the case, then control returns to step S1701 and processing from the checking of relationship in the vertical direction is repeated in the layer that is one rank higher.

In the case of FIGS. 18A and 18B, division width is page width and therefore tree generation is terminated. Finally, V0 of the uppermost layer representing the overall page is added to the document structure tree. After the document structure tree is completed, generation of application data is generated at step S1603 based upon this information.

In the case of FIGS. 18A and 18B, the details are as follows: In FIGS. 18A and 18B, H1 has the two blocks T1 and T2 in the horizontal direction and therefore is composed of two columns. After the internal information of T1 (text, image, etc., which is the result of character recognition with reference to the DAOF) is output, the column is changed and the internal information of T2 is output, after which S1 is output.

Further, H2 has the two blocks V1 and V2 in the horizontal direction and therefore is output as two columns. In block V1, the internal information is output in the order T3, T4, T5, after which the column is changed and the internal information of T7, T7 in V2 is output. Processing for effecting the conversion to application data can be executed by the operation above.

[Adding on Pointer Information]

Next, the processing of step S316 for adding on pointer information will be described. If an original electronic file to be processed has been identified by retrieval processing, or if an original electronic file could be reproduced by vectorization and the original electronic file is subjected to print processing, pointer information is added on when printing is performed on paper. As a result, when various processing is executed again using this document, the original electronic file can be acquired in simple fashion.

Figure 19:
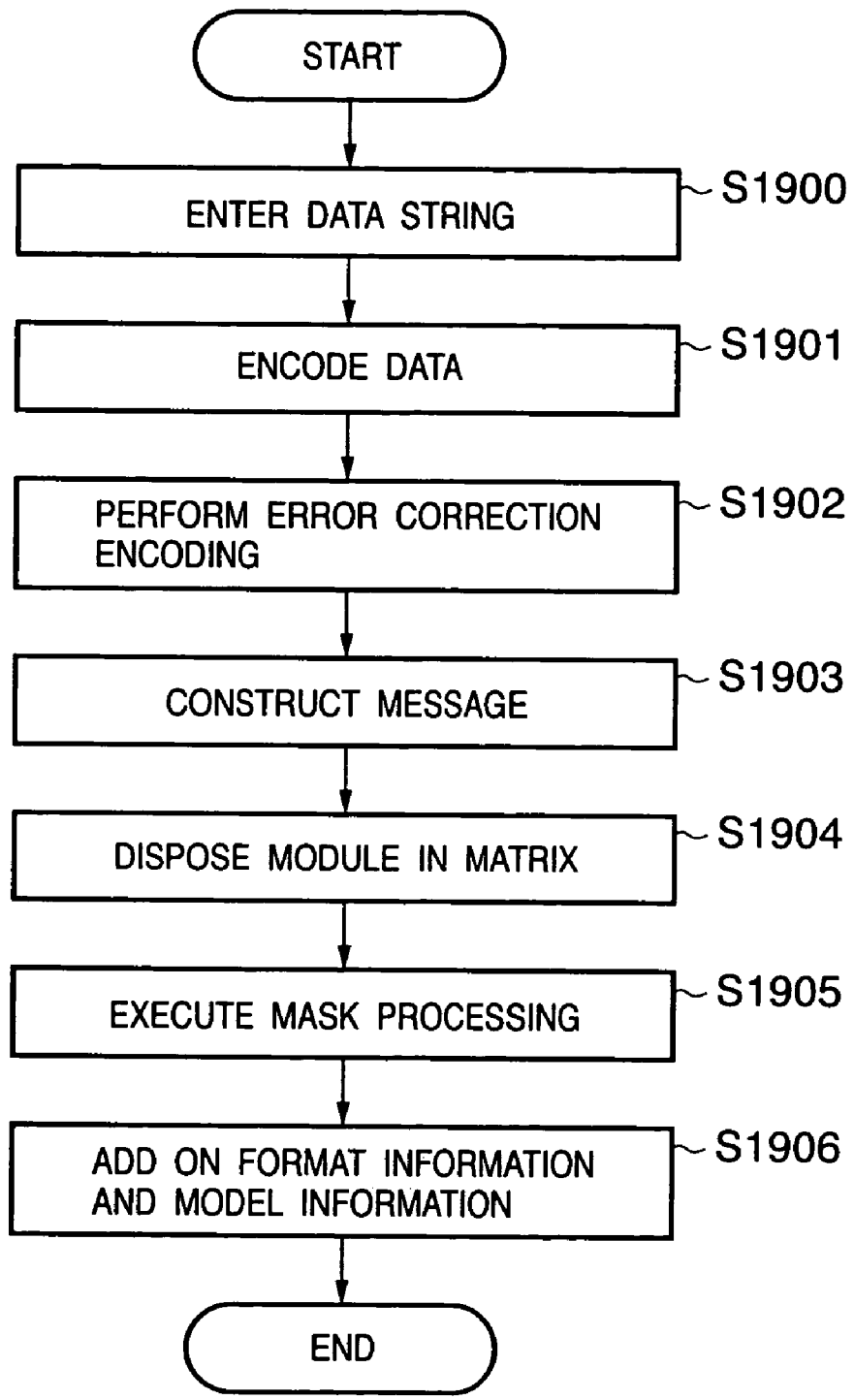
FIG. 19 is a flowchart illustrating a process through which a data character string serving as pointer information is encoded in the form of a two-dimensional bar code (QR code symbol: JIS X0510) and the code is added to an input image.

FIG. 19 is a flowchart illustrating a process through which a data character string serving as pointer information is encoded in the form of a two-dimensional bar code (QR code symbol: JIS X0510) 701 and added to an image.

Data incorporated in the two-dimensional bar code represents the address information of the corresponding original electronic file. For example, the data is constituted by path information comprising a file server name and a file name. Alternatively, the data is constituted by an URL leading to the corresponding original electronic file or a file ID managed in the hard disk in which the corresponding original electronic file has been stored or in the storage device 202 possessed by the MFP 100 per se.

First, the input data string is analyzed in order to identify various different characters to be encoded. Further, error detection and error correction level are selected and the smallest model that can be accommodated by the input data is selected (step S1900).

Next, the input data string is converted to a prescribed bit string and an indicator, which represents the mode of the data (numeric, alphanumeric, 8-bit byte, kanji, etc.), or a termination pattern is added on as necessary. A further conversion is made to a prescribed bit code word (step S1901).

In order to perform error correction at this time, the code word string is divided into a prescribed number of blocks in accordance with the model and error correction level, an error correction code word is generated for every block and this is appended to the end of the data code word string (step S1902)

The data code words of the blocks obtained at step S1902 are concatenated and an error correction code word of each block and, if necessary, a residue code word are appended (step S1903).

Next, a code word module is disposed in a matrix together with a position detection pattern, separation pattern, timing pattern and position combination pattern (step S1904).

Furthermore, the optimum master pattern is selected with regard to the symbol encoding area and a mask processing pattern is converted by an exclusive-OR operation to the module obtained at step S1904 (step S1905).

Finally, format information and model information is generated in the module obtained at step S1905, thereby completing the two-dimensional code symbol (step S1906).

In a case where an original electronic file is transmitted from, for example, the client personal computer 102 as print data and formed on paper as a print image by the printing device 203, the above-mentioned two-dimensional code in which address information has been incorporated is attached to the prescribed location on the raster data after it is converted to printable raster data in the data processor 205, as a result of which an image is formed. The paper on which the image has been formed is distributed to a user, and the user scans in the paper using the image reader 201, whereby the storage location of the original electronic file can be detected from the pointer information at step S304.

There are various means for applying additional information for a similar purpose. Besides the two-dimensional bar code described in this embodiment, means referred to generally as an electronic watermark can be applied. Examples of methods are a method of adding pointer information to a document directly by a character string, a method of embedding information by modulating a character string in a document, particularly the spacing between characters, and a method of embedding information in a halftone image within an input image.

Second Embodiment (Other Embodiment Relating to File-Access Privilege)

Figure 9:
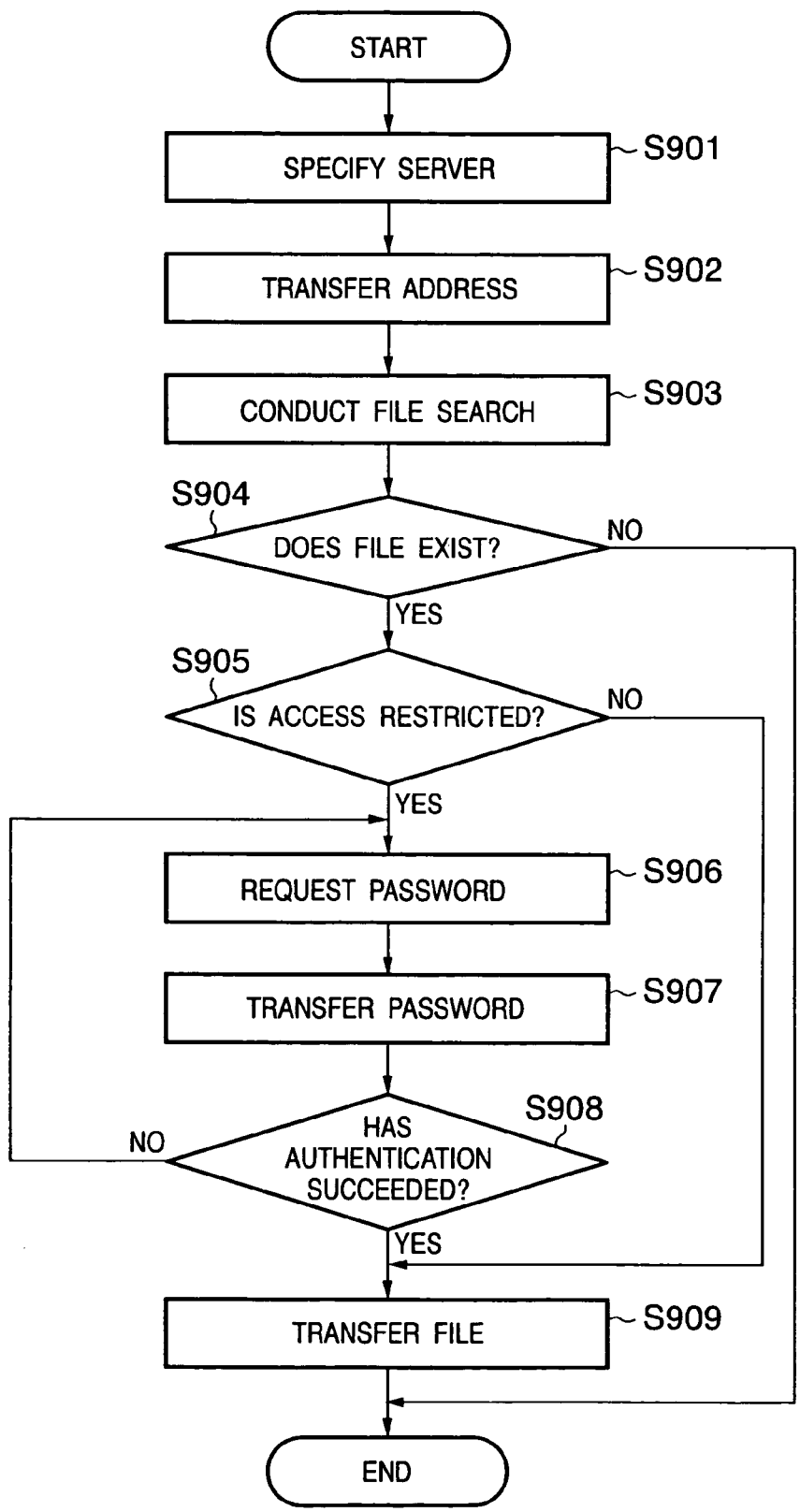
FIG. 9 is a flowchart illustrating the flow of processing regarding a case where, when an original electronic file has been retrieved from pointer information, the result of a search is that the original electronic file that could be identified has a restriction on access privilege.

The embodiment set forth above has been described on the assumption that all of the original electronic files that have been stored in a file server are freely accessible and that the objects of all or part of a file can be re-utilized in their entirety. However, there are situations where original electronic files handled include files whose re-utilization by third parties should be restricted. Accordingly, reference will be had to FIG. 9 of this embodiment to described processing in a case where, when an original electronic file has been retrieved from pointer information, the result of a retrieval is that the original electronic file that could be identified has a restriction on access privilege. It should be noted that processing up to step S903 in FIG. 9 is similar to that of the above embodiment and will not be described again.

If the original electronic file could be specified at step S904, then the file server investigates access-privilege of this original electronic file. If access is restricted ("YES" at step S905), then the MFP 100 is requested to transmit a password (step S906).

The MFP 100 prompts the operator for entry of a password and transmits the entered password to the file server (step S907). The file server checks the transmitted password and, if a match is obtained ("YES" at step S908), reports the address of the original electronic file in a manner similar to that (step S314) described in FIG. 3. If processing desired by the user is acquisition of the original electronic file, then the original electronic file is transferred to the MFP 100 (step S909). It should be noted that methods of authentication for controlling access privilege are not limited to the password-based method indicated at steps S906 and S907. Any authentication means may be used, such as widely used biological authentication (fingerprint authentication, etc.) and authentication by card.

Further, this embodiment is for a case where an original electronic file is specified by pointer information that has been added to a paper document. However, it is possible to execute similar processing also in a case where an original electronic file is specified by so-called compound retrieval processing indicated at steps S306 and S308 in FIG. 3.

If an original electronic file could not be specified from within the file server ("NO" at step S905), on the other hand, then a limitation is applied to the vectorization processing described in step S310 of FIG. 3. Specifically, if the presence of a restriction on the right to access a paper document has been detected from image information obtain by scanning in the paper document, then vectorization processing is executed only if authentication has been achieved, thereby making it possible to limit use of a document having a high level of confidentiality.

Third Embodiment

Figure 20:
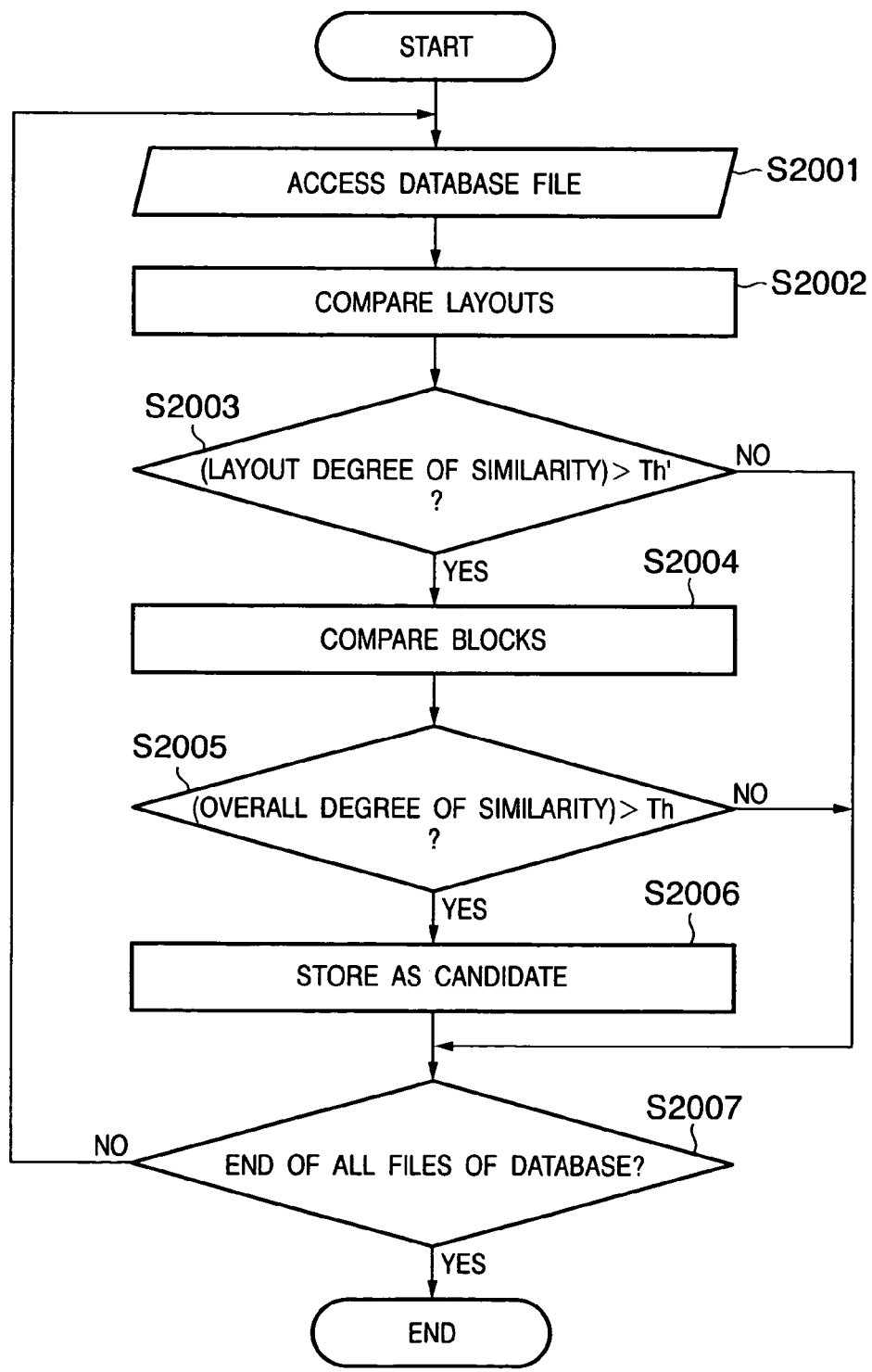
FIG. 20 is a flowchart illustrating the flow of processing when file selection based upon layout information is performed.

When an input image and original electronic files of a database are compared in a file search according to the above embodiment, layout information is compared and so is information within blocks with regard to all blocks of all input images. However, instead of performing a comparison of information contained within blocks, it is possible to select a file to the extent that it is in a stage where it has undergone comparison of layout information. In other words, original electronic files in a database for which the layouts are completely different from the layout of the input image can be excluded from processing for comparison of information contained in blocks. FIG. 20 is a flowchart for when file selection based upon layout information is performed.

First, a comparison of positions, sizes and attributes is performed with regard to all blocks of the input image, the degree of similarity is found and the layout degree of similarity of the entire original electronic file is found (step S2001). If layout degree of similarity is equal to or less than a predetermined threshold value, then a comparison of information contained in blocks is not executed (step S2002). On the other hand, a comparison of information contained in blocks is carried out (step S2003) in a case where the layout degree of similarity is greater than the predetermined threshold value, that is, only in a case where the layouts are similar. Overall degree of similarity of the entire file is obtained based upon the layout degree of similarity found and the degree of similarity of the information contained in the blocks (step S2004). A technique for obtaining the overall degree of similarity from the degree of similarity of each block is processing similar to that of step S1213 in FIG. 12 and need not be described again here. An original electronic file for which the degree of similarity is greater than the threshold value is stored as a candidate. Processing for obtaining the degree of similarity of information contained in blocks generally is processing with a heavy load, as when matching of photographs is performed in particular. Accordingly, by narrowing down files to the extent that they are layout information, the amount of retrieval processing can be reduced and processing speed can be increased, thereby making it possible to retrieve a desired file more efficiently.

Fourth Embodiment

The foregoing embodiments have been described with regard to retrieval processing in a case where a search is conducted without the user issuing orders at the time of a file search. However it is possible to optimize a file search by allowing the user to specify a portion that is a feature in an input image (that is, to specify a block obtained from block selection), to omit a needless block, and to specify a feature in an input image.

FIG. 21 illustrates an example of a user interface screen (2101) for allowing the user to specify search options. An input image is divided into a plurality of blocks by block selection processing, and various blocks such as text, photos, tables and line art in a file are displayed as thumbnail images on the input screen (2111 to 2117). The user selects a block that is a feature from among the blocks displayed. A plurality of blocks may be selected at this time. For example, assume that block 2114 has been selected. When a button "EMPHASIZE" (2102) is pressed in a state in which the block 2114 has been selected, retrieval processing that emphasizes block 2114 is executed. Emphasized retrieval refers to enlarging the weighting coefficient of the specified block 2114 when overall degree of similarity is found from the degree of similarity of every block and diminishing the weighting coefficients of blocks other than the block selected. Further, if an "EXCLUDE" button (2103) is pressed, retrieval processing is executed in a state in which the selected block 2114 is omitted. As a result, in a case where a block has been recognized erroneously, the user can omit needless retrieval processing and prevent erroneous retrieval processing. Further, the attribute of a block can be changed by a "SET DETAILS" button (2104). By allowing the user to make a correction even in a case where an attribute has been recognized erroneously in block selection (step S302), accurate retrieval can be performed. Further, the "SET DETAILS" button 2104 makes it possible for the user to adjust more finely the retrieval priority weighting of a block. Thus, when a search is conducted, the user is allowed to specify and set the block that will be the feature, thereby optimizing the search.

A case in which a layout is a special layout also is conceivable depending upon the input image. By selecting a "LAYOUT PRIORITY" button (2105) in relation to such an input file, it is possible to conduct a file search that emphasizes layout. This can be achieved by applying weighting in such a manner that the result of degree of similarity of the layout is emphasized further. Further, if a "TEXT PRIORITY" button (2106) is selected, then a search is conducted using only a text block and processing can be reduced.

By thus allowing the user to select the features of an image, a search that emphasizes the features of an input image can be conducted. Further, if, when weighting is changed by reliable artificial means, that is, by a command from the user, a restriction is applied that will not allow the retrieval of an excluded block for which the changed weighting will fall below a threshold value, then processing for retrieving needless blocks can be reduced by a wide margin through a simple operation by the user.

Fifth Embodiment

In the first embodiment, a search is conducted by a full-text search method and concept search method at steps S1209 and S1211 using text obtained by encoding an input image. However, it may be so arranged that use is made of another search technique that employs text.

Other Embodiments

The present invention can be applied to a system constituted by a plurality of devices (for example, a host computer, interface, reader, printer, etc.) or to an apparatus comprising a single device (for example, a copier or facsimile machine, etc.).

Furthermore, it goes without saying that the object of the invention is attained also by supplying a storage medium storing the program codes of the software for performing the functions of the foregoing embodiments to a system or an apparatus, reading the program codes with a computer (for example, a CPU or MPU) of the system or apparatus from the storage medium, and then executing the program codes.

In this case, the program codes read from the storage medium implement the novel functions of the embodiments and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the functions of the above embodiments.

The present invention is not limited to the above embodiments and various changes and modifications can be made within the spirit and scope of the present invention. Therefore to apprise the public of the scope of the present invention, the following claims are made.

What is claimed is:

1. An information processing apparatus for retrieving image files similar to an input document image from a plurality of image files, comprising:
   a memory for storing the input document image;
   a segmentation unit constructed to segment the input document image into text areas and image areas;
   a first similarity calculation unit constructed to calculate a first degree of similarity for text areas included in the plurality of image files, wherein the first similarity calculation unit applies a first type of similarity calculation which uses all of text data extracted by character recognition from each of the text areas obtained by segmentation by said segmentation unit;
   a second similarity calculation unit constructed to calculate a second degree of similarity for text areas included in the plurality of image files, wherein the second similarity calculation unit applies a second type of similarity calculation which uses a part of the text data extracted by character recognition from each of the text areas obtained by segmentation by said segmentation unit;
   a third similarity calculation unit constructed to calculate a third degree of similarity for image areas included in the plurality of image files, wherein the third similarity calculation unit applies a third type of similarity calculation which uses a feature extracted from each of the image areas obtained by segmentation by said segmentation unit;
   an input unit constructed to input first, second and third priority information for weighting the first, second and third degrees of similarity calculated by each of said first, second and third similarity calculation units, wherein the first, second and third priority information respectively correspond to each similarity calculation unit and are input using said input unit;
   an acquisition unit constructed to acquire, for each image file, the first, second and third degrees of similarity calculated by said first, second, and third similarity calculation units;
   a calculation unit constructed to calculate an overall degree of similarity for each image file by weighting, on the basis of the first, second and third priority information, each of the first, second and third degrees of similarity which have been acquired by said acquisition unit for each image file; and
   a display unit constructed to display a second plurality of image files acquired based upon the calculated overall degrees of similarity, and constructed to display information which represents the type of similarity calculation used for calculating the overall degree of similarity for each of the second plurality of image files.

2. The apparatus according to claim 1, wherein said display unit sorts and displays, in order of decreasing overall degree of similarity, information relating to the overall degree of similarity calculated for every displayed image file and the information which represents the type of similarity calculation used for calculating the overall degree of similarity.

3. The apparatus according to claim 1, wherein said display unit displays the overall degree of similarity calculated for every image file in the form of a graph.

4. The apparatus according to claim 1, further comprising:
   a calculation-area designating unit constructed to designate, based on a command from a user, an area to be used in the calculation of the degree of similarity from among the areas obtained by segmentation by said segmentation unit;
   wherein if an area is designated by said calculation-area designating unit, only the similarity calculation unit or units which calculate the degree of similarity for the area designated by said calculation-area designating unit from among said first, second and third similarity calculation units calculates the degree of similarity.

5. The apparatus according to claim 1, further comprising:
   an area designating unit constructed to designate, based on a command from a user, an area to be emphasized by the user from among the areas obtained by segmentation by said segmentation unit;
   wherein said calculation unit increases the weighting the degree or degrees of similarity for the area designated by said area designating unit from among the acquired first, second and third degrees of similarity and then calculates the overall degree of similarity.

6. The apparatus according to claim 1, further comprising a conversion unit constructed to convert the input document image to vector data if the overall degree of similarity that has been calculated by said calculation unit is equal to or less than a predetermined value.

7. The apparatus according to claim 6, wherein said conversion unit includes a character recognition unit constructed to recognize characters in the input document image.

8. The apparatus according to claim 6, wherein said conversion unit converts the input document image to vector data for every area obtained by segmentation by said segmentation unit.

9. An information processing method for retrieving image files similar to an input document image from a plurality of image files, comprising:
   a segmentation step of segmenting the input document image, by a data processor, into text areas and image areas;

a first similarity calculation step of calculating a first degree of similarity for text areas included in the plurality of image files, wherein the first similarity calculation step applies a first type of similarity calculation which uses all of text data extracted by character recognition from each of the text areas obtained by segmentation in said segmentation step;

a second similarity calculation step of calculating a second degree of similarity for text areas included in the plurality of image files, wherein the second similarity calculation step applies a second type of similarity calculation which uses part of the text data extracted by character recognition from each of the text areas obtained by segmentation in said segmentation step;

a third similarity calculation step of calculating a third degree of similarity for image areas included in the plurality of image files, wherein the third similarity calculation step applies a third type of similarity calculation which uses a feature extracted from each of the image areas obtained by segmentation in said segmentation step;

an input step of inputting first, second and third priority information for weighting the first, second and third degrees of similarity calculated in each of said first, second and third similarity calculation steps, wherein the first, second and third priority information respectively correspond to each similarity calculation step and are input in said input step;

an acquisition step of acquiring, for each image file, the first, second and third degrees of similarity calculated in said first, second and third similarity calculation steps;

a calculation step of calculating an overall degree of similarity for every image file by weighting, on the basis of the first, second and third priority information, each of the first, second and third degrees of similarity which have been acquired in said acquisition step for each image file; and a display step of displaying a second plurality of image files acquired based upon the calculated overall degrees of similarity, and of displaying information which represents the type of similarity calculation used for calculating the overall degree of similarity for each of the second plurality of image files.

10. The method according to claim 9, wherein information relating to the overall degree of similarity calculated for every displayed image file and the information which represents the type of similarity calculation used for calculating the overall degree of similarity are sorted and displayed, in order of decreasing overall degree of similarity, in said display step.

11. The method according to claim 9, wherein the overall degree of similarity calculated for every image file is displayed in said display step in the form of a graph.

12. The method according to claim 9, further comprising:
a calculation-area designating step of designating, based on a command from a user, an area to be used in the calculation of the degree of similarity for each of the areas obtained by segmentation in said segmentation step;
wherein if an area is designated in said calculation-area designating step, the degree of similarity is calculated in only the similarity calculation step or steps which calculate the degree of similarity for the area designated in said calculation-area designating step from among said first, second and third similarity calculation steps.

13. The method according to claim 9, further comprising:
an area designating step of designating, based on a command from a user, an area to be emphasized by the user from among the areas obtained by segmentation in said segmentation step;
wherein weighting for the degree or degrees of similarity for the area designated in said area designating step from among the acquired first, second and third degrees of similarity is increased in said calculation step and then the overall degree of similarity is calculated in said calculation step.

14. The method according to claim 9, further comprising a conversion step of converting the input document image to vector data if the overall degree of similarity that has been calculated in said calculation step is equal to or less than a predetermined value.

15. The method according to claim 14, wherein said conversion step includes a character recognition step of recognizing characters in the input document image.

16. The method according to claim 14, wherein the input document image is converted in said conversion step to vector data for each area obtained by segmentation in said segmentation step.

17. A storage medium storing a control program for causing the information processing method set forth in claim 9 to be implemented by a computer.

18. An information processing apparatus for retrieving an image file similar to an input document image from a plurality of image files, comprising:
a memory for storing the input document image;
a segmentation unit constructed to segment the input document image into text areas and image areas;
a first similarity calculation unit constructed to calculate a first degree of similarity for text areas included in the plurality of image files, wherein the first similarity calculation unit applies a first type of similarity calculation which uses all of text data extracted by character recognition from each of the text areas obtained by segmentation by said segmentation unit;
a second similarity calculation unit constructed to calculate a second degree of similarity for text areas included in the plurality of image files, wherein the second similarity calculation unit applies a second type of similarity calculation which uses part of the text data extracted by character recognition from each of the text areas obtained by segmentation by said segmentation unit;
a third similarity calculation unit constructed to calculate a third degree of similarity for image areas included in the plurality of image files, wherein the third similarity calculation unit applies a third type of similarity calculation which uses a feature extracted from each of the image areas obtained by segmentation by said segmentation unit;
an input unit constructed to input first, second and third priority information for weighting the first, second and third degrees of similarity calculated by each of said first, second and third similarity calculation units, wherein the first, second and third priority information respectively correspond to each similarity calculation unit and are input using said input unit;
an acquisition unit constructed to acquire, for each image file, the first, second and third degrees of similarity calculated by said first, second and third similarity calculation units;
a calculation unit constructed to calculate an overall degree of similarity for every image file by weighting, on the basis of the first, second and third priority information, each of the first, second and third degrees of similarity which have been acquired by said acquisition unit for each image file; and a display unit constructed to sort and display the plurality of image files, the overall degrees of similarity corresponding to image files, and information which represents the type of similarity calculation used for calculating each overall degree of similarity, in order of decreasing calculated overall degree of similarity.

19. An information processing apparatus for retrieving image files similar to an input document image from a plurality of image files, comprising:

a memory for storing the input document image;

a segmentation unit constructed to segment the input document image into text areas and image areas;

a first similarity calculation unit constructed to calculate a first degree of similarity for text areas included in the plurality of image files, wherein the first similarity calculation unit applies a first type of similarity calculation which uses all of text data extracted by character recognition from each of the text areas obtained by segmentation by said segmentation unit;

a second similarity calculation unit constructed to calculate a second degree of similarity for text areas included in the plurality of image files, wherein the second similarity calculation unit applies a second type of similarity calculation which uses part of the text data extracted by character recognition from each of the text areas obtained by segmentation by said segmentation unit;

a third similarity calculation unit constructed to calculate a third degree of similarity for image areas included in the plurality of image files, wherein the third similarity calculation unit applies a third type of similarity calculation which uses a feature extracted from each of the image areas obtained by segmentation by said segmentation unit;

an input unit constructed to input first, second and third priority information for weighting the first, second and third degrees of similarity calculated by each of said first, second and third similarity calculation units, wherein the first, second and third priority information respectively correspond to each similarity calculation unit and are input using said input unit;

a calculation-area designating unit constructed to designate, based on a command from a user, an area to be used in the calculation of the degree of similarity from among the areas obtained by segmentation by said segmentation unit;

an acquisition unit constructed to acquire, for each image file, the degree of similarity calculated by each similarity calculation unit which calculates the degree of similarity for the area designated by said calculation-area designating unit from among said first, second and third similarity calculation units;

a calculation unit constructed to calculate an overall degrees of similarity for each image file by weighting, on the basis of the first, second and third priority information, each degree of similarity which has been acquired by said acquisition unit; and a display unit constructed to display a second plurality of image files acquired based on the calculated overall degree of similarity and constructed to display information which represents the type of similarity calculation used for calculating the overall degree of similarity for each of the second plurality of image files.

20. An information processing apparatus for retrieving image files similar to an input document image from a plurality of image files, comprising:

a memory for storing the input document image;

a segmentation unit constructed to segment the input document image into text areas and image areas;

a first similarity calculation unit constructed to calculate a first degree of similarity for text areas included in the plurality of image files, wherein the first similarity calculation unit applies a first type of similarity calculation which uses all of text data extracted by character recognition from each of the text areas obtained by segmentation by said segmentation unit;

a second similarity calculation unit constructed to calculate a second degree of similarity for text areas included in the plurality of image files, wherein the second similarity calculation unit applies a second type of similarity calculation which uses part of the text data extracted by character recognition from each of the text areas obtained by segmentation by said segmentation unit;

a third similarity calculation unit constructed to calculate a third degree of similarity for image areas included in the plurality of image files, wherein the third similarity calculation unit applies a third type of similarity calculation which uses a feature extracted from each of the image areas obtained by segmentation by said segmentation unit;

an input unit constructed to input first, second and third priority information for weighting the first, second and third degrees of similarity calculated by each of said first, second and third similarity calculation units, wherein the first, second and third priority information respectively correspond to each similarity calculation unit and are input using said input unit;

an area designating unit constructed to designate, based on a command from a user, an area to be emphasized by the user from among the areas obtained by segmentation by said segmentation unit;

an acquisition unit constructed to acquire, for each image file, the first, second and third degrees of similarity calculated by said first, second and third similarity calculation units;

an calculation unit constructed to calculate an overall degree of similarity for each image file by weighting, on the basis of the first, second and third priority information, each of the first, second and third degrees of similarity which have been acquired by said acquisition unit for each image file, and constructed to increase weighting of each degree of similarity for the area designated by said area designating unit; and a display unit constructed to display a second plurality of image files acquired based on the calculated overall degrees of similarity and constructed to display information which represents the type of similarity calculation used for calculating the overall degree of similarity for each of the second plurality of image files.

21. An information processing method for retrieving image files similar to an input document image from a plurality of image files, comprising:

a segmentation step of segmenting the input document image, by a data processor, into text areas and image areas;

a first similarity calculation step of calculating a first degree of similarity for text areas included in the plurality of image files, wherein the first similarity calculation step applies a first type of similarity calculation which uses all of text data extracted by character recognition from each of the text areas obtained by segmentation in said segmentation step;

a second similarity calculation step of calculating a second degree of similarity for text areas included in the plurality of image files, wherein the second similarity calculation step applies a second type of similarity calculation which uses part of the text data extracted by character recognition from each of the text areas obtained by segmentation in said segmentation step;

a third similarity calculation step of calculating a third degree of similarity for image areas included in the plurality of image files, wherein the third similarity calculation step applies a third type of similarity calculation which uses a feature extracted from each of the image areas obtained by segmentation in said segmentation step;

an input step of inputting first, second and third priority information for weighting the first, second and third degrees of similarity calculated in each of said first, second and third similarity calculation steps, wherein the first, second and third priority information respectively correspond to each similarity calculation step and are input in said input step;

a acquisition step of acquiring, for each image file, the first, second and third degrees of similarity calculated in each of said first, second and third similarity calculation steps;

a calculation step of calculating an overall degree of similarity for each image file by weighting, on the basis of the first, second and third priority information, each of the first, second and third degrees of similarity which have been acquired in said acquisition step for each image file; and a display step of sorting and displaying the plurality of image files, the overall degrees of similarity corresponding to the image files, and information which represents the type of similarity calculation used for calculating each overall degree of similarity, in order of decreasing calculated overall degree of similarity.

22. An information processing method for retrieving image files similar to an input document image from a plurality of image files, comprising:

a segmentation step of segmenting the input document image, by a data processor, into text areas and image areas;

a first similarity calculation step of calculating a first degree of similarity for text areas included in the plurality of image files, wherein the first similarity calculation step applies a first type of similarity calculation which uses all of text data extracted by character recognition from each of the text areas obtained by segmentation in said segmentation step;

a second similarity calculation step of calculating a second degree of similarity for text areas included in the plurality of image files, wherein the second similarity calculation step applies a second type of similarity calculation which uses part of the text data extracted by character recognition from each of the text areas obtained by segmentation in said segmentation step;

a third similarity calculation step of calculating a third degree of similarity for image areas included in the plurality of image files, wherein the third similarity calculation step applies a third type of similarity calculation which uses a feature extracted from each of the image areas obtained by segmentation in said segmentation step;

an input step of inputting first, second and third priority information for weighting the first, second and third degrees of similarity calculated in each of said first, second and third similarity calculation steps, wherein the first, second and third priority information respectively correspond to each similarity calculation step and are input in said input step;

a calculation-area designating step of designating, based on a command from a user, an area to be used in the calculation of the degree of similarity from among the areas obtained by segmentation in said segmentation step;

a acquisition step of acquiring, for each image file, the degree of similarity calculated in each similarity calculation step which calculates the degree of similarity for the area designated in said calculation-area designating step from among said first, second and third similarity calculation steps;

a calculation step of calculating an overall degree of similarity for each image file by weighting, on the basis of the first, second and third priority information, each degree of similarity which has been acquired in said acquisition step for each image file; and a display step of displaying a second plurality of image files acquired based on the calculated overall degrees of similarity and of displaying information which represents the type of similarity calculation used for calculating the overall degree of similarity for each of the second plurality of image files.

23. An information processing method for retrieving image files similar to an input document image from a plurality of image files, comprising:

a segmentation step of segmenting the input document image, by a data processor, into text areas and image areas;

a first similarity calculation step of calculating a first degree of similarity for text areas included in the plurality of image files, wherein the first similarity calculation step applies a first type of similarity calculation which uses all of text data extracted by character recognition from each of the text areas obtained by segmentation in said segmentation step;

a second similarity calculation step of calculating a second degree of similarity for text areas included in the plurality of image files, wherein the second similarity calculation step applies a second type of similarity calculation which uses part of the text data extracted by character recognition from each of the text areas obtained by segmentation in said segmentation step;

a third similarity calculation step of calculating a third degree of similarity for image areas included in the plurality of image files, wherein the third similarity calculation step applies a third type of similarity calculation which uses a feature extracted from each of the image areas obtained by segmentation in said segmentation step;

an input step of inputting first, second and third priority information for weighting the first, second and third degrees of similarity calculated in each of said first, second and third similarity calculation steps, wherein the first, second and third priority information respectively correspond to each similarity calculation step and are input in said input step;

an area designating step of designating, based upon a command from a user, an area to be emphasized by the user from among the areas obtained by segmentation in said segmentation step;

a acquisition step of acquiring, for each image file, the first, second and third degrees of similarity calculated in each of said first, second and third similarity calculation steps;

a calculation step of calculating overall degrees of similarity for each image file by weighting, on the basis of the first, second and third priority information, each of the first, second and third degrees of similarity which has been acquired in said acquisition step for each image file and of increasing the weighting of each degree of similarity for the area designated in said area designating step; and a display step of displaying a second plurality of retrieved image files acquired based on the calculated overall degree of similarity and of displaying information which represents the type of similarity calculation used for calculating the overall degree of similarity for each of the second plurality of image files.

* * * * *